(12) United States Patent
Uryu et al.

(10) Patent No.: US 8,436,573 B2
(45) Date of Patent: May 7, 2013

(54) POWER CONVERSION DEVICE

(75) Inventors: Nobuhiko Uryu, Kariya (JP); Takashi Suzuki, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/357,843

(22) Filed: Jan. 25, 2012

(65) Prior Publication Data

US 2012/0194109 A1    Aug. 2, 2012

(30) Foreign Application Priority Data

Jan. 31, 2011    (JP) .................................. 2011-018490

(51) Int. Cl.

| | | |
|---|---|---|
| *H02P 27/04* | (2006.01) | |
| *H02P 6/00* | (2006.01) | |
| *H02P 6/12* | (2006.01) | |
| *H02P 27/00* | (2006.01) | |
| *H02P 7/00* | (2006.01) | |
| *H02H 7/08* | (2006.01) | |
| *H02M 1/14* | (2006.01) | |
| *H02M 7/44* | (2006.01) | |

(52) U.S. Cl.
    USPC ................. 318/801; 318/400.01; 318/400.15; 318/400.21; 318/400.3; 318/490; 318/496; 363/41; 363/98

(58) Field of Classification Search ............ 318/400.15, 318/400.21, 490, 496, 400.01, 400.3, 801; 363/41, 98
    See application file for complete search history.

(56) References Cited

U.S. PATENT DOCUMENTS

| | | | | |
|---|---|---|---|---|
| 7,439,697 | B2 * | 10/2008 | Miyazaki et al. | 318/400.41 |
| 8,154,241 | B2 * | 4/2012 | Suzuki | 318/802 |
| 2008/0258655 | A1 * | 10/2008 | Nagashima et al. | 318/105 |
| 2009/0128076 | A1 * | 5/2009 | Taniguchi | 318/400.41 |
| 2010/0001672 | A1 * | 1/2010 | Maeda et al. | 318/400.22 |
| 2011/0156626 | A1 * | 6/2011 | Mukai et al. | 318/400.21 |
| 2011/0156627 | A1 * | 6/2011 | Nakamura et al. | 318/400.22 |
| 2011/0221375 | A1 | 9/2011 | Suzuki | |
| 2012/0032625 | A1 * | 2/2012 | Suzuki | 318/490 |

FOREIGN PATENT DOCUMENTS

| | | |
|---|---|---|
| JP | 2001-197779 | 7/2001 |
| JP | 2007-306705 | 11/2007 |

* cited by examiner

*Primary Examiner* — Walter Benson
*Assistant Examiner* — Gabriel Agared
(74) *Attorney, Agent, or Firm* — Harness, Dickey & Pierce, PLC

(57) ABSTRACT

A power conversion device includes a first inverter circuit and a second inverter circuit, a capacitor, and a microcomputer. The microcomputer switches a control operation, according to the steering state of a steering wheel, between a first state where a first duty center value is shifted to be lower than an output center value and a second duty center value is shifted to be higher than the output center value, and a second state where the first duty center value is shifted to be higher than the output center value and the second duty center value is shifted to be lower than the output center value. This can reduce a difference in heat loss between FETs while reducing the ripple current of the capacitor.

12 Claims, 13 Drawing Sheets

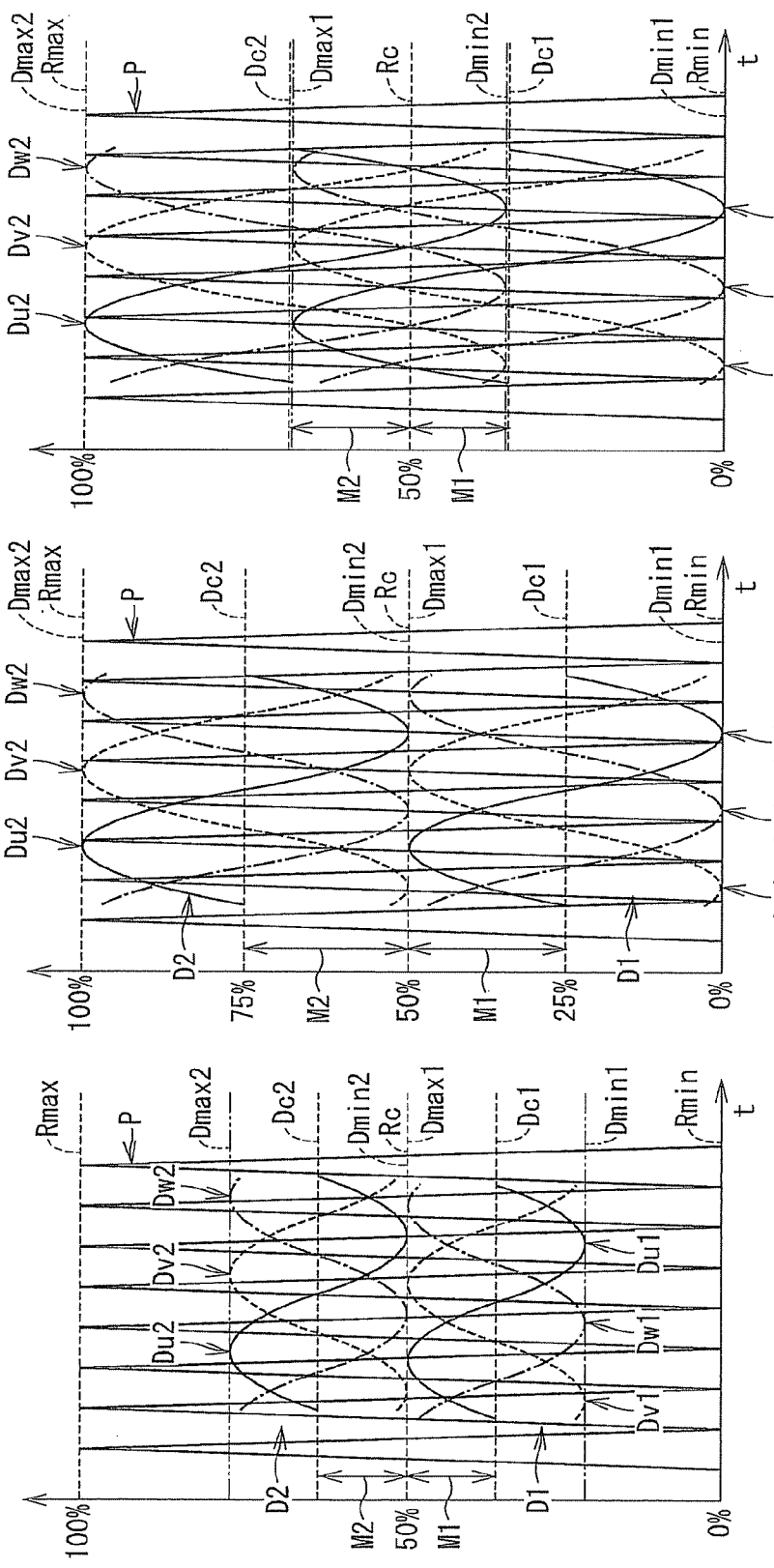

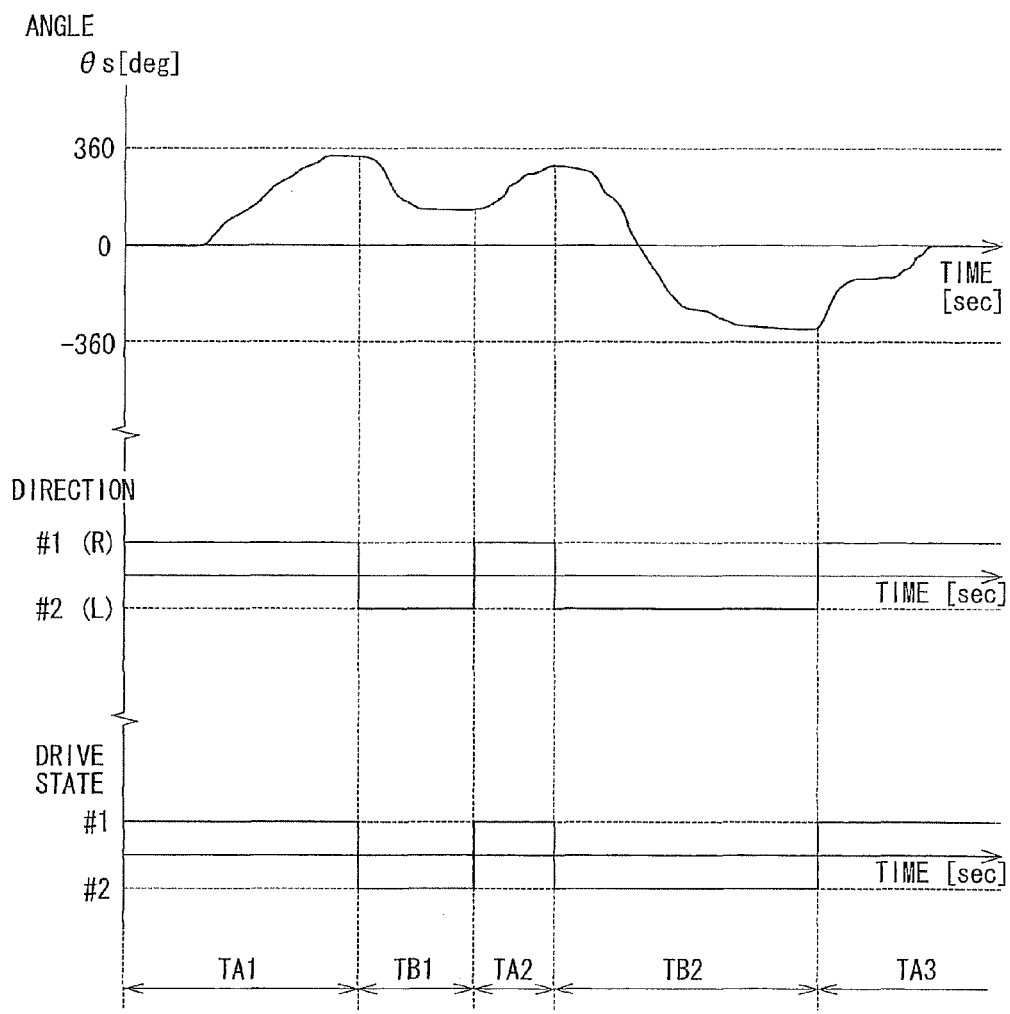

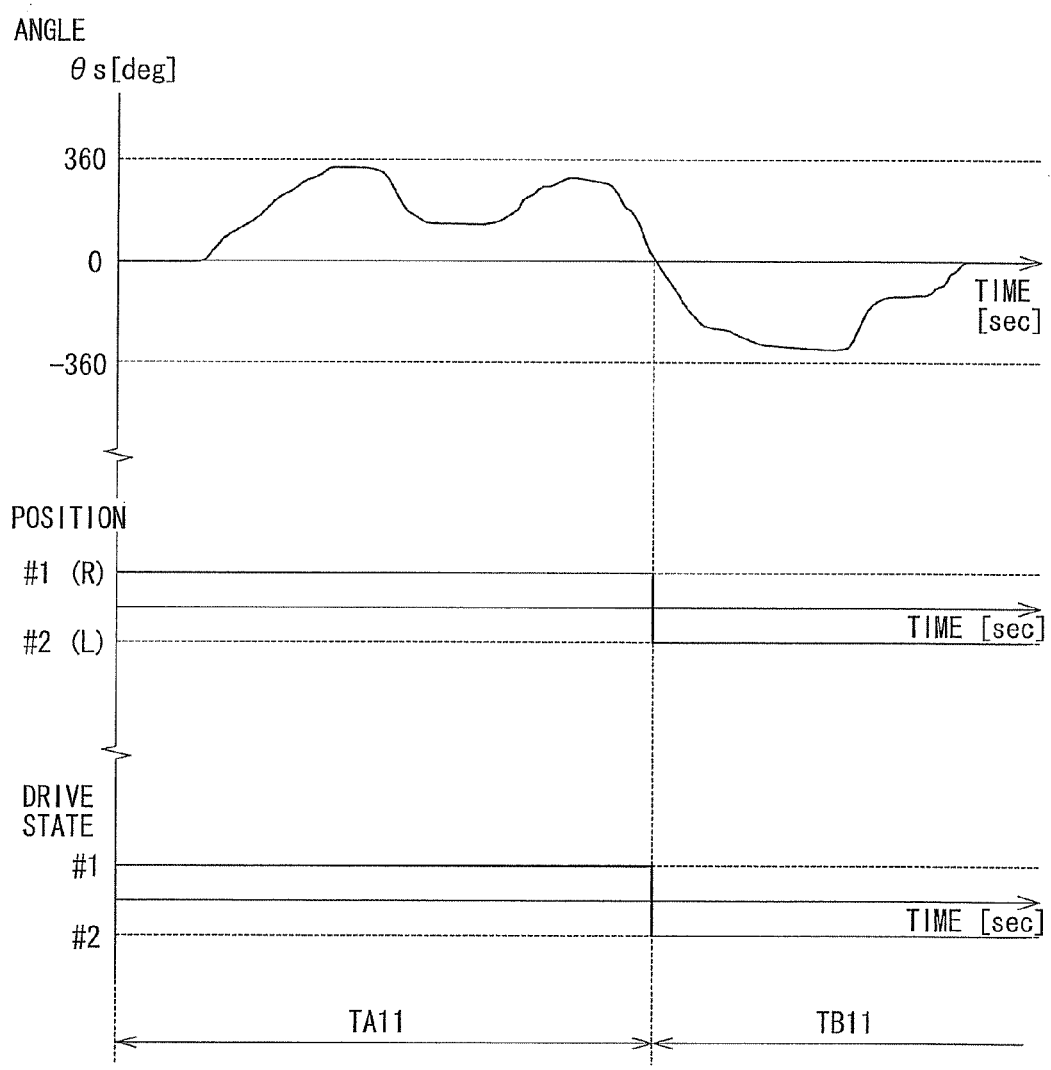

US 8,436,573 B2

POWER CONVERSION DEVICE

CROSS REFERENCE TO RELATED APPLICATION

This application is based on and incorporates herein by reference Japanese patent application No. 2011-18490 filed on Jan. 31, 2011.

TECHNICAL FIELD

The present invention relates to a power conversion device used for an electric power steering apparatus that imparts assist torque to a steering member.

BACKGROUND ART

A multiphase rotating electric machine is driven by controlling a current by pulse width modulation (PWM). For example, in a case where the multiphase rotating electric machine is a three-phase motor, a voltage reference signal related to voltages applied to three-phase windings, respectively, is compared with a PWM reference signal that is a carrier wave, such as a triangular wave, and a current that flows to the three-phase motor is controlled by switching on and off switching elements of an inverter.

In a case where the inverter is connected to a capacitor, when no current flows to the inverter, the capacitor is charged as a current flows into the capacitor from a power source. On the other hand, when a current flows to the inverter, the capacitor is discharged as a current flows to the inverter from the capacitor. In a case where PWM control is performed, a capacitor current is pulsed because charging and discharging are repeated in the capacitor during one cycle of PWM control. The capacitor current is pulsed, noise is generated or the capacitor generates heat. Additionally, fluctuation of voltage applied to the inverter may result in poor controllability of the inverter current. The pulsation of a current that flows into the capacitor is a ripple current.

Thus, for example, in JP 2001-197779A, a phase difference is imposed on switching timings of switching elements between two sets of bridge circuits, based on pre-stored map data, so that a waveform of a summed capacitor current approaches a smooth waveform to reduce the ripple current. Additionally, in JP 2007-306705A, in a case where two axes are connected in a PWM amplifier, a voltage command value for one axis is biased to Vcc/4 (Vcc is a power source voltage) while a voltage command value for the other axis is biased to −Vcc/4 to reduce the ripple current.

However, JP 2001-197779A requires a delay circuit for imposing a phase difference on the switching timings according to a modulation ratio and a power factor, to output the resulting switching timings. Additionally, it is necessary to detect currents in a plurality of systems at short intervals, and operation load is heavy.

Additionally, in JP 2007-306705A, for example, in a case where two inverter systems are present, a voltage command value is biased to be higher by ¼ of a power source voltage in one of the two inverter systems. If the voltage command value is biased higher (upwards), the time for which a higher-potential-side switching element provided at a higher potential is turned on becomes longer than the time for which a lower-potential-side switching element provided at a lower potential is turned on. Additionally, in the other inverter system, the voltage command value is biased to be lower by ¼ of the power source voltage. If the voltage command value is biased lower (downwards), the time for which the lower-potential-side switching element is turned on becomes longer than the time for which the higher-potential-side switching element is turned on. If the time for which the higher-potential-side switching element is turned on is different from the time for which the lower-potential-side switching element is turned on, the amount of currents to be applied may be different, which may result in a difference in heat loss. If the difference occurs in heat loss between the switching elements, a marginal thermal design or an asymmetrical heat dissipation design is required. Otherwise, it is necessary to use respectively different elements as the switching elements.

SUMMARY OF THE INVENTION

It is an object of the present invention to provide a power conversion device that reduces a difference in heat loss between switching elements while reducing a ripple current of a capacitor.

A power conversion device is provided for a multiphase rotating electric machine, which includes a first and a second sets of windings. Each set is formed by windings corresponding to each phase of the rotating electric machine of an electric power steering apparatus that imparts assist torque to a steering member. The power conversion device comprises a first and a second inverter circuits, a capacitor, and a control circuit.

The first and the second inverter circuits are provided for the first and the second sets of windings, respectively. Each inverter circuit has switching elements corresponding to each phase of each set of windings. The capacitor is connected to the first and the second inverter circuits. The control circuit controls on/off of the switching elements based on a first voltage command signal related to a first voltage applied to the first set of windings and a second voltage command signal related to a second voltage applied to the second set of windings. The control circuit switches a control operation between a first state and a second state according to a steering state of the steering member. The first state corresponds to a case where a center value of the first voltage command signal is shifted to be lower than an output center value that is a center value of a possible duty range and a center value of the second voltage command signal is shifted to be higher than the output center value. The second state corresponds to a case where the center value of the first voltage command signal is shifted to be higher than the output center value and the center value of the second voltage command signal is shifted to be lower than the output center value.

BRIEF DESCRIPTION OF THE DRAWINGS

The above and other objects, features and advantages of the present invention will become more apparent from the following detailed description made with reference to the accompanying drawings. In the drawings:

FIGS. 6A to 6C are time charts illustrating duty command signal shift processing according to the first embodiment of the invention;

FIG. 11 is a time chart illustrating shift direction specifying processing performed in a third embodiment of the invention;

FIG. 12 is a time chart illustrating shift direction specifying processing performed in a fourth embodiment of the invention;

DETAILED DESCRIPTION OF THE INVENTION

Figure 1:
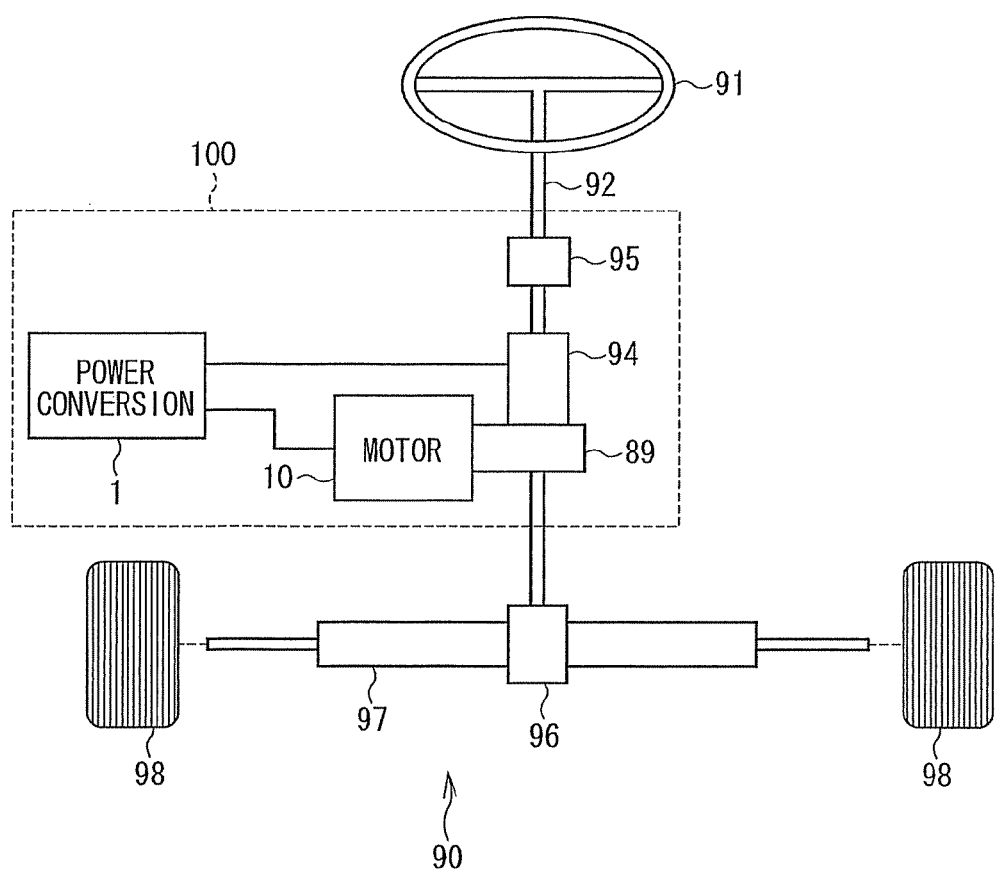
FIG. 1 is a schematic diagram illustrating a steering system using a power conversion device according to a first embodiment of the invention.

A power conversion device will be described below with, reference to various embodiments shown in the accompanying drawings, in which substantially the same components are designated by the same reference numerals to simplify the description.

(First Embodiment)

A power conversion device is designated by a reference numeral 1 and used in an electric power steering apparatus 100 of a vehicle according to a first embodiment as shown in FIG. 1.

The electric power steering apparatus 100 is used for a steering system 90 of a vehicle. The steering system 90 is formed by a steering wheel 91, a steering shaft 92, a pinion gear 96, a rack gear 97, a tire (steered wheel) 98, and the like. The steering wheel 91 is steered by a driver. The steering shaft 92 is coupled to the steering wheel 91, and rotates with the steering of the steering wheel 91. The longitudinal end of the steering shaft 92 opposite to the steering wheel 91 is provided with the pinion gear 96 that meshes with the rack gear 97. A pair of tires 98 is respectively coupled to both ends of the rack gear 97 via tie rods or the like. The rotational motion of the steering shaft 92 is converted into a rectilinear motion by the pinion gear 96 and the rack gear 97, and right and left tires 98 is steered according to the displacement of the rectilinear motion of the rack gear 97. The electric power steering apparatus 100 includes a power conversion device 1, a motor 10, a reducer (reduction gear unit) 89, and the like.

The motor 10 is a three-phase brushless motor, which normally and reversely rotates the reducer 89. However, any kind of motor may be used.

The reducer 89 reduces the rotational speed of the motor 10 and transfers torque generated by the motor 10 to the steering shaft 92. That is, the motor 10 generates assist torque for reducing steering torque required for steering the steering wheel 91 by a driver, and imparts the assist torque to the steering wheel 91.

Figure 3:
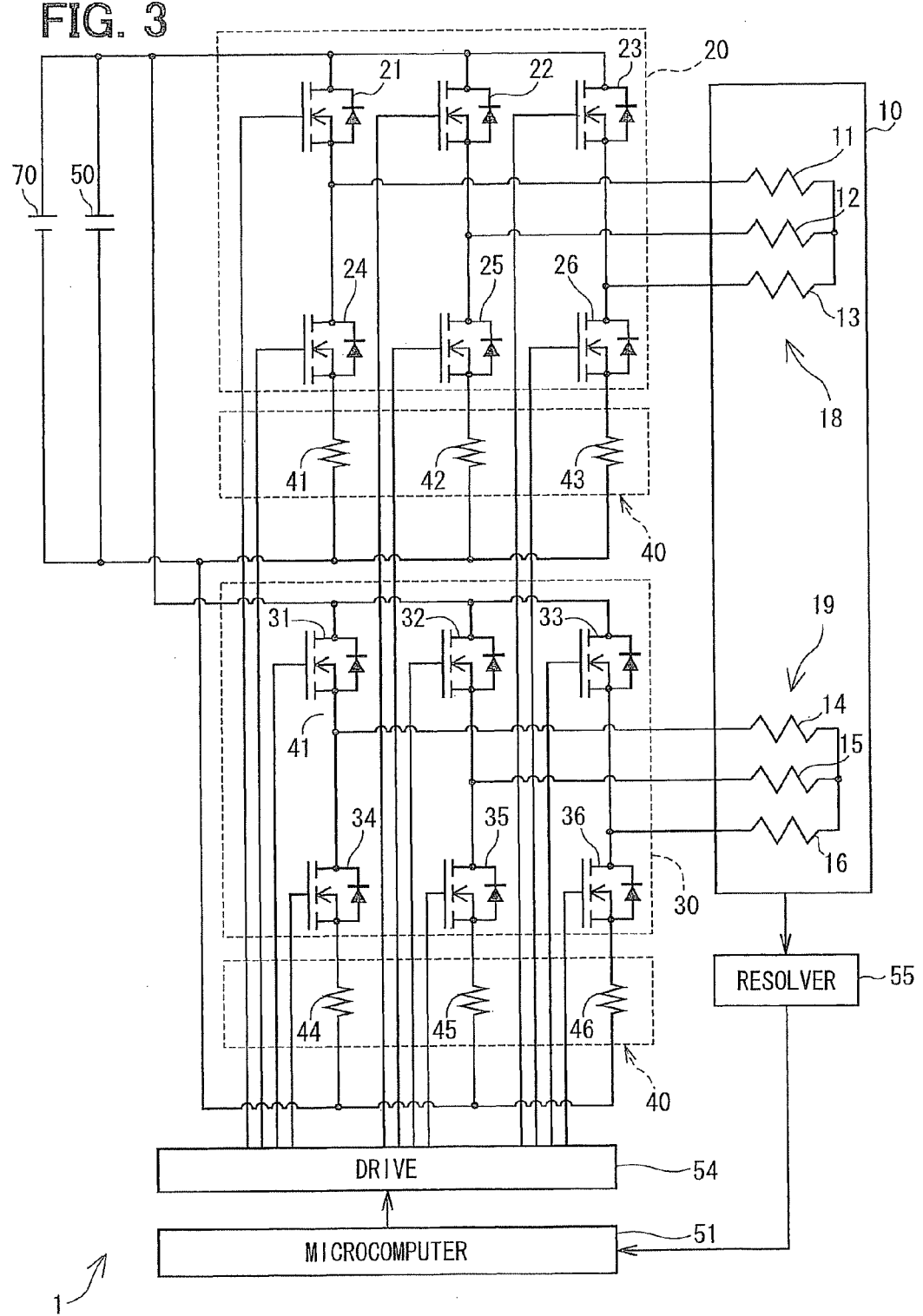
FIG. 3 is a circuit diagram illustrating the power conversion device according to the first embodiment of the invention.

The motor 10 has a rotor and a stator although not illustrated. The rotor, which is a disc-like member, has permanent magnets stuck on the surface thereof, and thus has magnetic poles. The stator accommodates the rotor and rotatably supports the rotor therein. The stator has projections that project at predetermined angle intervals in a radial direction, and a U1 coil 11, a V1 coil 12, a W1 coil 13, a U2 coil 14, a V2 coil 15 and a W2 coil 16 shown in FIG. 3 are wound around the projections. The U1 coil 11, the V1 coil 12, and the W1 coil 13 form a first set of windings 18. Additionally, the U2 coil 14, the V2 coil 15, and the W2 coil 13 form a second set of windings 19. The first set of windings 18 and the second set of windings 19 correspond to two sets of windings.

Additionally, the motor 10 is provided with a resolver 55 that detects the rotation angle θe of the motor 10. A microcomputer (CPU) S1, which is a control circuit, acquires a rotation angle signal produced by the resolver 55, and calculates the rotation angle θe of the motor 10.

Figure 2:
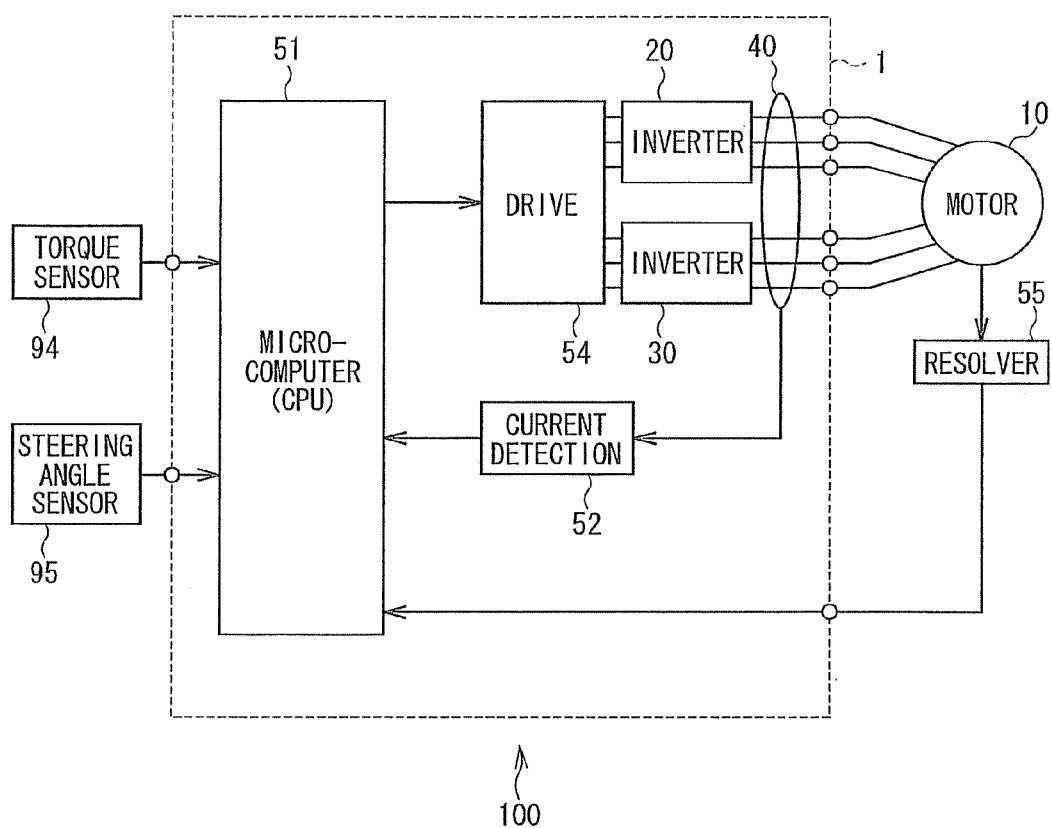
FIG. 2 is a block diagram illustrating an electric power steering apparatus using the power conversion device according to the first embodiment of the invention.

As shown in FIGS. 1 and 2, the electric power steering apparatus 100 includes a torque sensor 94 and a steering angle sensor 95. The torque sensor 94 is provided at the steering shaft 92 to detect a torque according to the steering torque generated as a driver steers the steering wheel 91, and outputs a detected torque signal to the microcomputer 51. In the microcomputer 51, the steering torque is calculated based on the torque signal.

Additionally, the steering angle sensor 95 is provided at the steering shaft 92 to detect a steering angle according to the steering angle of the steering wheel 91, and outputs a detected steering angle signal to the microcomputer 51. In the microcomputer 51, the steering angle θs of the steering wheel 91 is calculated based on the steering angle signal detected by the steering angle sensor 95. In addition, the steering angle θs is set to 0 degrees when the steering wheel 91 is located at the center (neutral position), has a positive value in a case where the steering wheel is steered rightward from the center, and has a negative value in a case where the steering wheel is steered leftward from the center.

The power conversion device 1 includes a first inverter circuit 20, a second inverter circuit 30, a current detection circuit 40, a capacitor 50, the microcomputer 51 current detection circuit 52, a drive circuit 54, and the like. The first inverter circuit 20 and the second inverter circuit 30 form an inverter section.

As shown in FIG. 3, the first inverter circuit 20 is a three-phase inverter, and six switching elements 21 to 26 are bridged in order to switch application of electric currents to the U1 coil 11, the V1 coil 12, and the W1 coil 13, respectively, of the first set of windings 18. Although the switching elements 21 to 26 are MOSFETs (metal-oxide-semiconductor field-effect transistors) that are kinds of field-effect transistors, elements other than MOSFETs may be used. Hereinafter, the switching elements 21 to 26 are referred to as FETs 21 to 26.

Three FETs 21 to 23 have drains connected to a positive pole of a battery 70. Additionally, the sources of the FETs 21 to 23 are connected to the drains of FETs 24 to 26, respectively. The sources of FETs 24 to 26 are connected to a negative pole of the battery 70.

A node between paired FET 21 and FET 24 is connected to one end of the U1 coil 11. Additionally, a node between paired FET 22 and FET 25 is connected to one end of the V1 coil 12. Moreover, a node between paired FET 23 and FET 26 is connected to one end of the W1 coil 13.

Similarly to the first inverter circuit 20, the second inverter circuit 30 is a three-phase inverter, and six switching elements 31 to 36 are bridged in order to switch application of electric currents to the U2 coil 14, the V2 coil 15, and the W2 coil 16, respectively, of the second set of windings 19. Although the switching elements 31 to 36 are MOSFETs similar to the switching elements 21 to 26, elements other than MOSFETs may be used. Hereinafter, the switching elements 31 to 36 are referred to as FETs 31 to 36.

Three FETs 31 to 33 have drains connected to the positive pole of the battery 70. Additionally, the sources of the FETs 31 to 33 are connected to the drains of FETs 34 and 36, respectively. The sources of the FETs 34 to 36 are connected to the negative pole of the battery 70.

A node between paired FET 31 and FET 34 is connected to one end of the U2 coil 14. Moreover, a node between paired FET 32 and FET 35 is connected to one end of the V2 coil 15. Moreover, a node between paired FET 33 and FET 36 is connected to one end of the W2 coil 16.

Hereinafter, the FETs 21 to 23 and the FETs 31 to 33, which are provided as higher-potential-side switching elements, and the FETs 24 and 26 and the FETs 34 to 36, which are provided as lower-potential-side switching elements, are referred to as high-side FETs, and low-side FETs, respectively. Additionally, when necessary, each FET is referred to with its phase as, for example, U1 high-side FET 21.

A current detection circuit 40 is formed by a U1 current detector 41, a V1 current detector 42, a W1 current detector 43, a U2 current detector 44, a V2 current detector 45, and a W2 current detector 46. The U1 current detector 41 is provided between a U1 low-side FET 24 and the ground to detect a current that flows to the U1 coil 11. The V1 current detector 42 is provided between a V1 low-side FET 25 and the ground to detect a current that flows to the V1 coil 12. The W1 current detector 43 is provided between a W1 low-side FET 26 and the ground to detect a current that flows to the W1 coil 13. Additionally, the U2 current detector 44 is provided between a U2 low-side FET 34 and the ground to detect a current that flows to the U2 coil 14. The V2 current detector 45 is provided between a V2 low-side FET 35 and the ground to detect a current that flows to the V2 coil 15. The W2 current detector 46 is provided between a W2 low-side FET 36 and the ground to detect a current that flows to the W2 coil 16.

Current detectors 41 to 46 are formed by shunt resistors. The detection values (AD values) detected by the current detectors 41 to 46 are stored in registers (not shown). In addition, acquisition of the AD values by the registers is simultaneously performed in the current detectors 41 to 46. At this time, the rotation angle signal of the motor 10 detected by the resolver 55 is also acquired simultaneously. In addition, in FIG. 3, control lines from the current detection circuit 40 are omitted in order to avoid complication.

The capacitor 50 is connected to the battery 70, the first inverter circuit 20, and the second inverter circuit 30, and accumulates electric charges to assist in supply of electric power to the FETs 21 to 26 and 31 to 36, or suppresses noise components, such as a surge current.

Various kinds of operation processing are performed by the microcomputer 51. In a current detection circuit 52 (FIG. 2), a sensor output value is acquired from the current detection circuit 40, and a current detection value is calculated. Specifically, a current detection value Iu1 that is the value of a current applied to the U1 coil 11 is calculated based on the AD value of the U1 current detector 41, a current detection value Iv1 that is the value of a current applied to the V1 coil 12 is calculated based on the AD value of the V1 current detector 42, and a current detection value Iw1 that is the value of a current applied to the W1 coil 13 is calculated based on the AD value of W1 current detector 43. A current detection value Iu2 that is the value of a current applied to the U2 coil 14 is calculated based on the AD value of the U2 current detector 44, a current detection value Iv2 that is the value of a current applied to the V2 coil 15 is calculated based on the AD value of the V2 current detector 45, and a current detection value Iw2 that is the value of a current applied to the W2 coil 16 is calculated based on the AD value of W2 current detector 46.

In the microcomputer 51, a feedback operation is performed based on the rotation angle θe of the motor 10 calculated based on the current detection values Iu1, Iv1, Iw1, Iu2, IV2, and Iw2 calculated by the current detection circuit 52, and the rotation angle signal detected by the resolver 55, and the like, and a current command value related to the driving of the motor 10 is calculated. Then, switching on/off of the FETs 21 to 26 of the first inverter circuit 20 and the FETs 31 to 36 of the second inverter circuit 30 are controlled via the drive circuit 54 based on the calculated current command value. Thereby, the driving of the motor 10 is controlled by controlling the application of currents to the coils 11 to 16.

Figure 4:
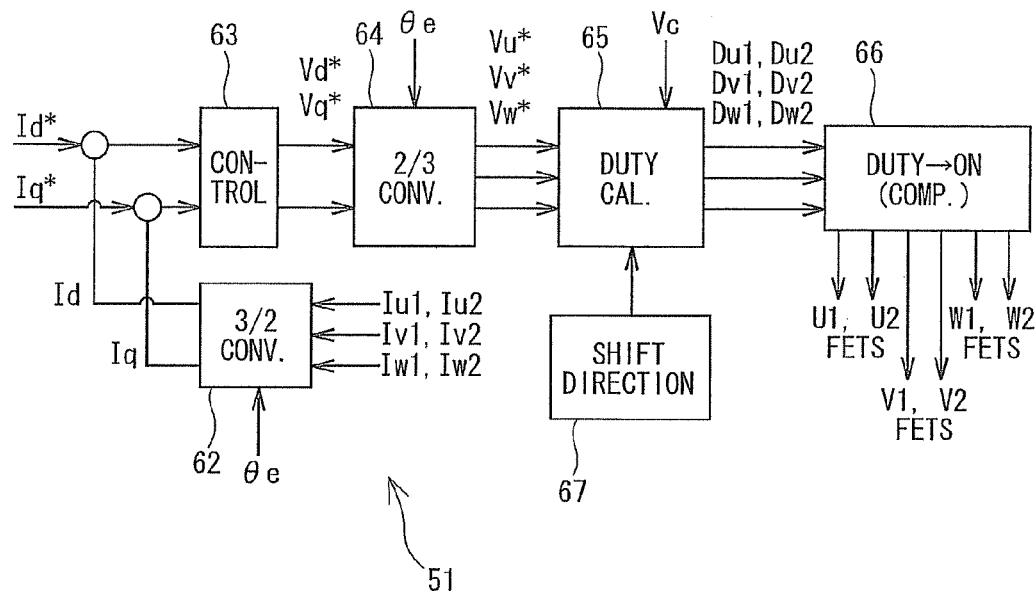
FIG. 4 is a block diagram illustrating a microcomputer in the first embodiment of the invention.
Figure 5:
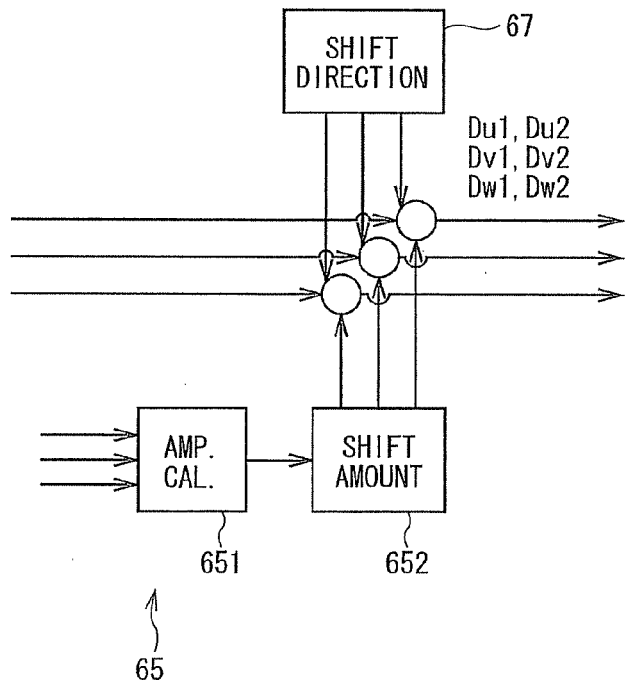
FIG. 5 is a block diagram illustrating a duty calculation section in the first embodiment of the invention.

The microcomputer 51 is programmed to perform functions (processing), which are shown as a circuit or section form in FIGS. 4 and 5. As shown in FIG. 4, the microcomputer 51 has a three-phase/two-phase (3/2) converter 62, a control circuit 63, a two-phase/three-phase (2/3) converter 64, a duty calculation circuit 65, a triangular wave comparator 66, a shift direction specifying circuit 67, and the like.

Control processing of the microcomputer 51 will be described based on FIGS. 4 and 5.

The three-phase/two-phase converter 62 reads current detection values Iu1, Iv1, Iw1, Iu2, Iv2, and Iw2 calculated in a current detection circuit 52, and the rotation angle θe of the motor 10, and calculates a d-axis current detection value Id and a q-axis current detection value Iq.

In the control circuit 63, a current feedback control operation is performed based on a d-axis current command value Id* and a q-axis current command value Iq* calculated based on the steering torque and the d-axis current detection value Id and q-axis current detection value Iq, so that a d-axis voltage command value Vd* and a q-axis voltage command value Vq* are calculated. More specifically, a current deviation ΔId between the d-axis current command value Id* and the d-axis current detection value Id, and a current deviation ΔIq between the q-axis current command value Iq* and the q-axis current detection value Iq are calculated, and the voltage command values Vd* and Vq* are calculated so that current deviations ΔId and ΔIq converge into zero in order to follow current command values Id* and Iq*.

In the two-phase/three-phase converter 64, three-phase voltage command values Vu*, Vv*, and Vw* are calculated based on the voltage command values Vd* and Vq* calculated in the control circuit 63, and the rotation angle θe of the motor 10.

In the duty calculation circuit 65, as shown in FIG. 5, the amplitudes of the three-phase voltage command values Vu*, Vv*, and Vw* are calculated by an amplitude calculation circuit 651. In a shift amount calculation circuit 652, the shift amounts of the three-phase voltage command values Vu*, Vv*, and Vw* are calculated based on the amplitudes of the three-phase voltage command values Vu*, Vv*, and Vw* calculated by the amplitude calculation circuit 651. A U-phase duty Du1, a V-phase duty Dv1, and a W-phase duty Dw1 related to the driving of the first inverter circuit 20, and a U-phase duty Du2, a V-phase duty Dv2, and a W-phase duty Dw2 related to the driving of the second inverter circuit 30 are calculated based on the three-phase voltage command values Vu*, Vv*, Vw*, the shift amounts calculated by the shift amount calculation circuit 652, a switching flag set by the shift direction specifying circuit 67, and a capacitor voltage Vc. The respective phase duties Du1, Dv1, Dw1, Du2, and Dw2 are written in the registers. In addition, as for the calculation of the respective phase duties Du1, Dv1, Dw1, Du2, Dv2, and Dw2, the shift amounts may be calculated after the three-phase voltage command values Vu*, Vv*, and Vw* are converted into duties.

The shift direction specifying processing shown as the shift direction specifying circuit 67 will be described below.

In the triangular wave comparator 66, on/off signals of the FETs 21 to 26 are calculated by comparing the calculated U-phase duty Du1, V-phase duty Dv1, and W-phase duty Dw1 related to the driving of the first inverter circuit 20 with a PWM reference value P. In the time charts of the following figures, the duties and the reference value are shown as electric signal waveform. Specifically, the U-phase duty Du1 is compared with the PWM reference value. When the U-phase duty Du1 is equal to or higher than the PWM reference value, the U1 high-side FET 21 is turned on and the U1 low-side FET 24 is turned off. When the U-phase duty Du1 is lower than the PWM reference value, the U1 high-side FET 21 is turned off and the U1 low-side FET 24 is turned on. Additionally, the V-phase duty Dv1 is compared with the PWM reference value. When the V-phase duty Dv1 is equal to or higher than the PWM reference value, the V1 high-side FET 22 is turned on and the V1 low-side FET 25 is turned off. When the U-phase duty Dv1 is lower than the PWM reference value, the V1 high-side FET 22 is turned off and the V1 low-side FET 25 is turned on. Moreover, the W-phase duty Dw1 is compared with the PWM reference value. When the W-phase duty Dw1 is equal to or higher than the PWM reference value, the W1 high-side FET 23 is turned on and the W1 low-side FET 26 is turned off. When the W-phase duty Dw1 is lower than the PWM reference value, the W1 high-side FET 23 is turned off and the W1 low-side FET 26 is turned on.

Additionally, on/off signals of the FETs 31 to 36 are calculated by comparing the calculated U-phase duty Du2, V-phase duty Dv2, W-phase duty Dw2 related to the driving of the second inverter circuit 30 with the PWM reference value.

Specifically, the U-phase duty Du2 is compared with the PWM reference value. When the U-phase duty Du2 is equal to or higher than the PWM reference value, the U2 high-side FET 31 is turned on and the U2 low-side FET 34 is turned off. When the U-phase duty Du2 is lower than the PWM reference value, the U2 high-side FET 31 is turned off and the U2 low-side FET 34 is turned on. Additionally, the V-phase duty Dv2 is compared with the PWM reference value. When the V-phase duty Dv2 is equal to or higher than the PWM reference value, the V2 high-side FET 32 is turned on and the V2 low-side FET 35 is turned off. When the V-phase duty Dv2 is lower than the PWM reference value, the V2 high-side FET 32 is turned off and the V2 low-side FET 35 is turned on. Moreover, the W-phase duty Dw2 is compared with the PWM reference value. When the W-phase duty Dw2 is equal to or higher than the PWM reference value, the W2 high-side FET 33 is turned on and the W2 low-side FET 36 is turned off. When the W-phase duty Dw2 is lower than the PWM reference value, the W2 high-side FET 33 is turned off and the W2 low-side FET 36 is turned on.

In addition, the processing of the triangular wave comparator 66 is performed in an electric circuit in the microcomputer 51. This processing can be either processing using software or processing using hardware.

A first duty command signal D1 as a first voltage command signal related to the driving of the first inverter circuit 20 is formed by three sinusoidal signals, that is, the U-phase duty Du1 related to a voltage applied to the U1 coil 11, the V-phase duty Dv1 related to a voltage applied to the V1 coil 12, and the W-phase duty Dw1 related to a voltage applied to the W1 coil 13.

A second duty command signal D2 as a second voltage command signal related to the driving of the second inverter circuit 30 is formed by three sinusoidal signals, that is, the U-phase duty Dug related to a voltage applied to U2 coil 14, the V-phase duty Dv2 related to a voltage applied to the V1 coil 15, and the W-phase duty Dw2 related to a voltage applied to the W2 coil 16 (FIGS. 6A to 6C).

In the first embodiment, the ripple current of the capacitor 50 is reduced by shifting one of a center value Dc1 (first duty center value Dc1) of the first duty command signal D1 and a center value Dc2 (second duty center value Dc2) of the second duty command signal D2 to be lower than (below) an output center value Rc that is a center value of a possible duty range, and shifting the other center value to be higher than (above) the output center value Rc. Additionally, the shift amount from the output center value Rc is made variable according to the amplitudes of the first duty command signal D1 and the second duty command signal D2.

Here, it is assumed that, as shown in FIGS. 6A to 6C, the first duty center value Dc1 is shifted to be lower than the output center value Rc and the second duty center value Dc2 is shifted to be higher than the output center value Rc.

In the first embodiment, the possible duty range is 0% to 100% of a power source voltage, and the output center value Rc that is the center value of the possible duty range is 50%. In addition, the voltage of the battery 70 is 12 V, and if the possible duty range is converted to a voltage, 0 V to 12 V is capable of being output, and hence the output center value Rc corresponds to 6V. Additionally, the frequency of the PWM reference value is 20 kHz. In addition, the same or in-phase triangular wave signals are used as the PWM reference value related to the driving of the first inverter circuit 20 and the PWM reference value related to the driving of the second inverter circuit 30. Additionally, the amplitude of the first duty command signal D1 and the amplitude of the second duty command signal D2 are equal to each other. In addition, here, since both the first duty command signal D1 and the second duty command signal D2 are sinusoidal signals (that is, expressed by A sin δ+B), a value (that is, A) obtained by dividing a value obtained by subtracting a minimum value of each command signal from a maximum value thereof by 2 is an amplitude.

As shown in FIG. 6A, in a case where the amplitude of first duty command signal D1 is equal to or lower than 25% of the possible duty range, that is, in a case where a minimum value Dmin1 of the first duty command signal D1 when the first duty center value Dc1 is shifted to be lower (downwards) so that a maximum value Dmax1 of the first duty command signal D1 become the output center value Rc is equal to or higher than a lower limit Rmin of the possible duty range, the first duty command signal D1 shifts the first duty center value Dc1 downwards from the output center value Rc so that the maximum value Dmax1 becomes the output center value Rc.

On the other hand, in a case where the amplitude of the second duty command signal D2 is equal to or lower than 25% of the possible duty range, that is, in a case where a maximum value Dmax2 of the second duty command signal D2 when the second duty center value Dc2 is shifted to be higher (upwards) so that a minimum value Dmin2 of the second duty command signal D2 becomes the output center value Rc is equal to or lower than an upper limit Rmax of the possible duty range, the second duty command signal D2 shifts the second duty center value Dc2 upwards from the output center value Rc so that the minimum value Dmin2 becomes the output center value Rc.

As shown in FIG. 6B, in a case where the amplitudes of first duty command signal D1 and the second duty command signal D2 are 25% of the possible duty range, if the first duty center value Dc1 is shifted downwards so that the maximum value Dmax1 of the first duty command signal D1 becomes the output center value Rc, the minimum value Dmin1 of the first duty command signal D1 coincides with the lower limit Rmin of the possible duty range. At this time, the first duty center value Dc1 is shifted downwards by 25% of the possible duty range based on the output center value Rc. That is, the first duty center value Dc1 at this time is Rc−25=25%.

Additionally, if the second duty center value Dc2 is shifted upwards so that the minimum value Dmin2 of the second duty command signal D2 becomes the output center value Rc, the maximum value Dmax2 of the second duty command signal D2 coincides with the upper limit Rmax of the possible duty range. At this time, the second duty center value Dc2 is shifted upwards by 25% of the possible duty range based on the output center value Rc. At this time, the second duty center value Dc2 is Rc+25=75%.

As shown in FIG. 6C, in a case where the amplitude of the first duty command signal D1 is higher than 25% of the possible duty range, if the first duty center value Dc1 is shifted downwards so that the maximum value Dmax1 of the first duty command signal D1 becomes the output center value Rc, the minimum value Dmin1 of first duty command signal D1 becomes smaller than the lower limit Rmin of the possible duty range. If the first duty command signal D1 exceeds the possible duty range, distortion occurs in output voltage. Thus, in a case where the amplitude of the first duty command signal D1 is higher than 25% of the possible duty range, that is, in a case where the minimum value Dmin1 of the first duty command signal D1 when the first duty center value Dc1 is shifted so that the maximum value Dmax1 of the first duty command signal D1 becomes the output center value Rc is smaller than the lower limit Rmin of the possible duty range, the first duty center value Dc1 is shifted so that the minimum value Dmin1 of the first duty command signal D1 coincides with the lower limit Rmin of the possible duty range.

Additionally, in a case where the amplitude of the second duty command signal D2 is higher than 25% of the possible duty range, if the second duty center value Dc2 is shifted upwards so that the minimum value Dmin2 of the second duty command signal D2 becomes the output center value Rc, the maximum value Dmax2 of the second duty command signal D2 becomes higher than the upper limit Rmax of the possible duty range. If the duty command signal D2 exceeds the possible duty range, distortion occurs in output voltage. Thus, in a case where the amplitude of the second duty command signal D2 is higher than 25% of the possible duty range, that is, in a case where the maximum value Dmax2 of the second duty command signal D2 when the second duty center value Dc2 is shifted so that the minimum value Dmin2 of the second duty command signal D2 becomes the output center value Rc becomes higher than the upper limit Rmax of the possible duty range, the second duty center value Dc2 is shifted so that the maximum value Dmax2 of the second duty command signal D2 coincides with the upper limit Rmax of the possible duty range.

In a case where the amplitude of the first duty command signal D1 is equal to or lower than 25% of the possible duty range, the first duty center value Dc1 is shifted so as to be separated downwards from the output center value Rc as the amplitude becomes higher. Additionally, in a case where the amplitude of the first duty command signal D1 is higher than 25% of the possible duty range, the first duty center value Dc1 is shifted in a direction approaching the output center value Rc from the first duty center value Dc1 when the amplitude is 25% of the possible duty range as the amplitude becomes higher.

In a case where the amplitude of the second duty command signal D2 is equal to or lower than 25% of the possible duty range, the second duty center value Dc2 is shifted so as to be separated upwards from the output center value Rc as the amplitude becomes higher. Additionally, in a case where the amplitude of the second duty command signal D2 is higher than 25% of the possible duty range, the second duty center value Dc2 is shifted in a direction approaching the output center value Rc from the second duty center value Dc2 when the amplitude is 25% of the possible duty range as the amplitude becomes higher.

That is, in the first embodiment, a shift amount M1 of the first duty center value Dc1 and a shift amount M2 of the second duty center value Dc2 are made variable according to the amplitudes of the duty command signals D1 and D2.

Such a configuration is particularly effective when the amplitudes of the duty command signals D1 and D2 are 25% or less of the possible duty range.

Figure 7A:
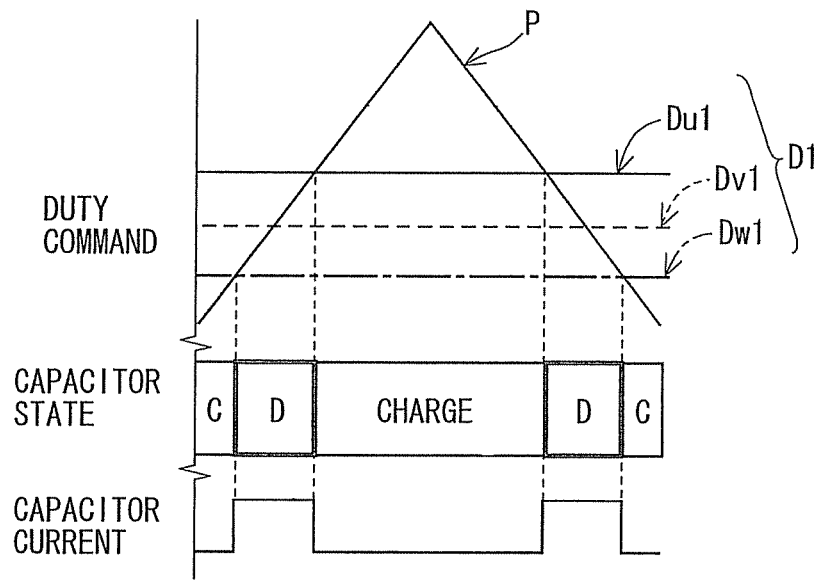
FIGS. 7A and 7B are time charts illustrating a capacitor current in a case where a duty command signal is shifted.
Figure 7B:
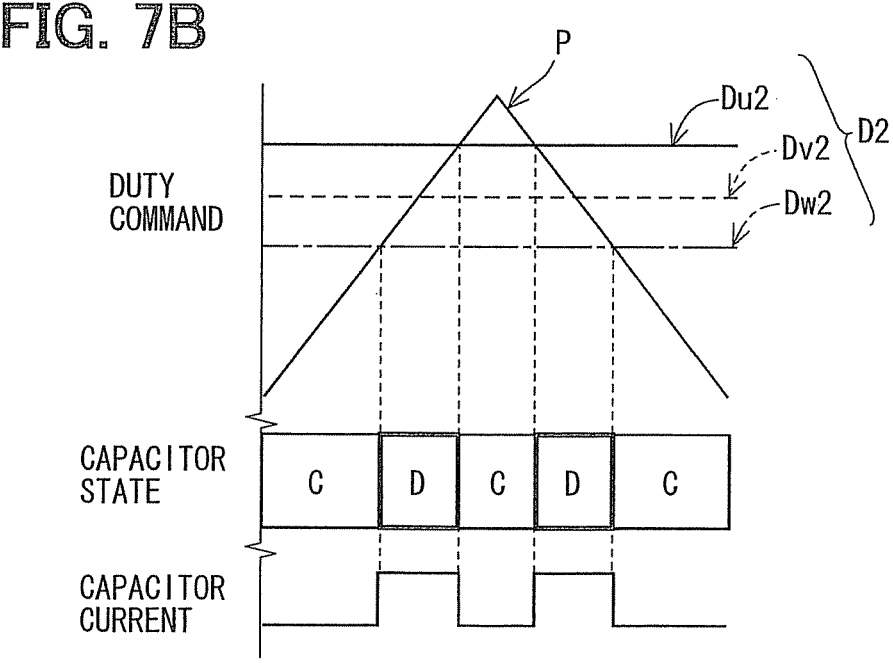

Here, a capacitor current in a case where the first duty command signal D1 is shifted downwards from the output center value Rc and the second duty command signal D2 is shifted upwards from the output center value Rc will be described with reference to FIGS. 7A and 7B. FIG. 7A shows the relationship between the first inverter circuit 20 and the capacitor 50, and FIG. 7B shows the relationship between the second inverter circuit 30 and the capacitor 50. Additionally, the output center value Rc is omitted in FIGS. 7A and 7B.

As shown in FIG. 7A, the capacitor 50 is charged (indicated by C) in a period during which the PWM reference value P exceeds or falls below the first duty command signal D1 in all phases. On the other hand, the capacitor 50 is discharge (indicated by D) in a period for which the PWM reference value P is located in the first duty command signal D1.

Additionally, in a case where the first duty command signal D1 is shifted downwards, the charging period of the capacitor 50 at the peak of the PWM reference value P is relatively long, and the discharging period of the capacitor 50 approaches the valley side of one PWM cycle.

As shown in FIG. 7B, the capacitor 50 is charged in a period during which the PWM reference value P exceeds or falls below the second duty command signal D2 in all phases. On the other hand, the capacitor 50 is discharged in a period for which the PWM reference value P is located in the second duty command signal D2.

Additionally, in a case where the second duty command signal D2 is shifted upwards, the charging period of the capacitor 50 at the peak of the PWM reference value P is relatively short, and the discharging period of the capacitor 50 relatively approaches the center. Additionally, the charging period at the valley of the PWM reference signal is relatively long.

That is, in a case where a duty command signal is shifted downwards and in a case where the duty command signal is shifted upwards, since the generation timing of an effective voltage vector and the generation timing of a zero voltage vector are different from each other, and deviation occurs in periods during which the capacitor 50 is charged and discharged. Therefore, in a case where there is no phase difference in the PWM reference value P, since deviation occurs in the charging timing and discharging timing of the capacitor 50 by shifting one of the first duty command signal D1 and the second duty command signal D2 downwards and shifting the other upwards, the ripple current of the capacitor 50 can be reduced. In addition, if the shift is made so that the first duty command signal D1 and the second duty command signal D2 do not overlap each other when the amplitudes of the duty command signals D1 and D2 are small, when being discharged by one inverter circuit, the capacitor 50 is charged by the other inverter circuit.

In addition, if the voltage between windings does not change even if the duty command signals D1 and D2 are shifted upwards or downwards, voltages applied to the sets of windings 18 and 19 do not change.

Meanwhile, in a case where the center values of the first duty command signals D1 and D2 are shifted upwards or downwards from the output center value Rc, the time for which a high-side FET is turned on is different from the time for which a low-side FET is turned on.

Figure 8A:
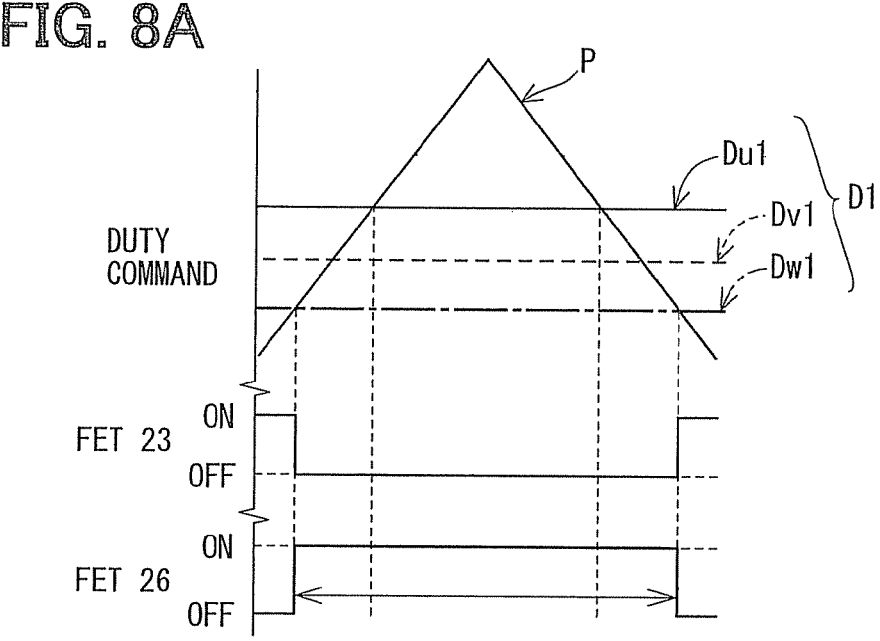
FIGS. 8A and 8B are time charts illustrating an on/off time of a switching element in a case where a duty command signal is shifted.

If the first duty command signal D1 is shifted downwards as shown in FIG. 8A, for example, the time for which the W1 low-side FET 26 is turned on, becomes long as compared to the W1 high-side FET 23. This is also the same in the U1 lower FET 24 and U1 high-side FET 21, and the V1 low-side FET 25 and the V1 high-side FET 22.

Figure 8B:
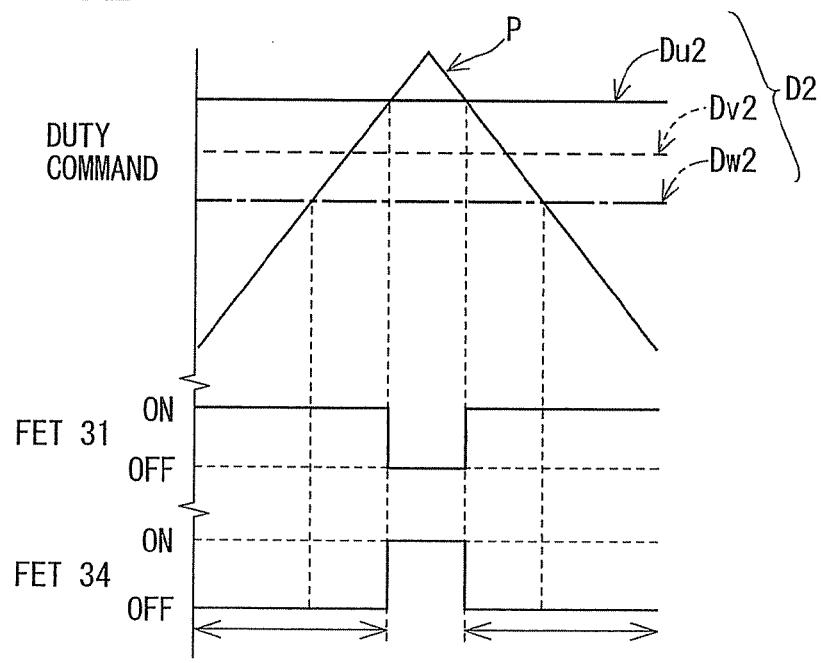

On the other hand, if the second duty command signal D2 is shifted upwards as shown in FIG. 8B, for example, the time for which the U2 high-side FET 31 is turned on, becomes long as compared to the U2 low-side FET 34. This is also the same in the V2 high-side FET 32 and the V2 low-side FET 35, and the W2 high-side FET 33, and the W2 low-side FET 36.

The difference between the time for which a high-side FET is turned on and the time for which a low-side FET is turned on becomes large as the shift amounts of the duty command signals D1 and D2 from the center of the possible duty range becomes large. Since an integrated current values change if the times for which paired high-side FET and low-side FET are turned on become different, difference occurs in heat loss between the high-side FET and the low-side FET.

Thus, it is preferable to replace the shift directions of the first duty command signal D1 and the second duty command signal D2 so that the integrated current values of the high-side FET and the low-side FET become the same.

In the first embodiment, the power conversion device 1 is applied to the electric power steering apparatus 100. Although the steering wheel 91 is steered to the right and left, a straight-ahead traveling state is necessarily present if the traveling of a vehicle is taken into consideration. That is, the operation of returning to the left is performed when being steered to the right, and the operation of returning to the right is performed when being steered to the left. In addition, although most of application of currents to the sets of windings 18 and 19 is not performed during straight-ahead traveling of a vehicle, the amount of an applied current increases at stopping of steering operation, such as driving the vehicle into a garage. Additionally, the time for which the steering wheel 91 is steered to the right and the time for which the steering wheel is steered to the left become approximately equal at stopping of the steering operation.

Thus, in the first embodiment, the characteristics in which the time for which the steering wheel 91 is steered to the right and the time for which the steering wheel is steered to the left become approximately equal at stopping of steering operation in which the amount of an applied current increases are used. The shift directions of the first duty command signal D1 and the second duty command signal D2 are switched according to the steering state of the steering wheel 91. The amounts of an applied current to a high-side FET and a low-side FET are made approximately equal to each other. Thus, a difference in heat loss between FETs 21 to 26 and 31 to 36 is reduced.

The shift direction specifying processing will be described with reference to a flowchart shown in FIG. 9, which is executed by the microcomputer 51. The shift direction specifying processing is shown as being executed in the shift direction specifying circuit 67 in FIGS. 4 and 5. In a first step S101 (S is used to indicate a step herein below), the switching flag is set to Fs=1 as a default. Here, when the switching flag Fs=1 is established this shall be a first state where the first duty center value Dc1 is shifted to be lower than the output center value Rc and the second duty center value Dc2 is shifted to be higher than the output center value Rc. In addition, when the switching flag Fs=0 is established this shall be a second state where the first duty center value Dc1 is shifted to be higher than the output center value Rc and the second duty center value Dc2 is shifted to be lower than the output center value Rc.

Additionally, a switching counter (count of a switching counter) is reset (Cs=0). In addition, the switching counter is provided to clock the time after the positive and negative signs of the q-axis current Iq are replaced with each other. Although the counter is used, clocking may be performed using a timer or the like.

In S102, a current detection value Iu1 of the U1 coil 11, a current detection value Iv1 of the V1 coil 12, and a current detection value Iw1 of the W1 coil 13 are read. Additionally, a current detection value Iu2 of the U2 coil 14, a current detection value Iv2 of the V2 coil 15, and a current detection value Iw2 of the W2 coil 16 are read. Moreover, the rotation angle θe of the motor 10 is read.

In S103, the q-axis current Iq as an actual current value is calculated based on current detection values Iu1, Iv1, Iw1, Iu2, Iv2, and Iw2 and the motor rotation angle θe. The q-axis current Iq is calculated by the following formula (1).

[Formula 1]

$$Iu = Iu1 + Iu2$$
$$Iv = Iv1 + Iv2$$
$$Iw = Iw1 + Iw2$$
$$Iq = \frac{1}{\sqrt{6}} \times \begin{Bmatrix} -2\sin(\theta e) \times Iu \\ +(\sin(\theta e) + \sqrt{3}\cos(\theta e)) \times Iv \\ +(\sin(\theta e) - \sqrt{3}\cos(\theta e)) \times Iw \end{Bmatrix} \quad (1)$$

In S104, it is checked whether or not the q-axis current Iq is equal to or higher than 0. If the q-axis current Iq is determined to be lower than 0 (S104: NO), that is, if the q-axis current Iq is negative, the processing proceeds to S109. If the q-axis current Iq is determined to be equal to or higher than 0 (S104: YES), that is, if the q-axis current Iq is positive, the processing proceeds to S105.

In S105, it is checked whether or not the switching flag Fs=1 is established. If it is determined that the switching flag Fs=1 is established (S105: YES), the processing proceeds to S108. If it is determined that the switching flag Fs=1 is not established (S105: NO), that is, if the switching flag Fs=0 is established, the processing proceeds to S106. The switching counter is incremented in S106.

In S107, it is checked whether or not the count value Cs of the switching counter is equal to or higher than a predetermined value. The predetermined value is set to 10, for example. The check processing here checks whether or not a predetermined time has elapsed after the q-axis current Iq became positive from negative. If it is determined that the count value Cs of the switching counter is lower than a predetermined value (S107: NO), that is, if the predetermined time has not elapsed after the q-axis current Iq became positive from negative, the processing returns to S102. If it is determined that the count value Cs of the switching counter is equal to or higher than the predetermined value (S107: YES), that is, if the predetermined time has elapsed after the q-axis current Iq became positive from negative, the processing proceeds to S108.

In S108, the switching flag is set (Fs=1). Further, the switching counter is reset (Cs=0) and the processing returns to S102. In addition, if step S108 is executed after the q-axis current Iq is determined to be positive and the switching flag Fs=1 is established (S104: YES and S105: YES), the first state where the first duty center value Dc1 is shifted to be lower than the output center value Rc and the second duty center value Dc2 is shifted to be higher than the output center value Rc is continued. Additionally, if S108 is executed after the q-axis current is determined to be positive, the switching flag Fs=0 is established, and the count value Cs of, the switching counter is determined to be equal to or higher than the predetermined value (S104: YES, S105: NO, S107: YES), the predetermined time has elapsed after the q-axis current Iq became positive from negative. Thus, the switching flag is set to Fs=1 in order to perform switching a second state where the first duty center value Dc1 is shifted to be higher than the output center value Rc and the second duty center value Dc2 is shifted to be lower than the output center value Rc to the first state where the first duty center value Dc1 is shifted to be lower than the output center value Rc and the second duty center value Dc2 is shifted to be higher than the output center value Rc.

In S109, which is executed if the q-axis current Iq is determined to be lower than zero (S104: NO), it is checked whether the switching flag is zero (Fs=0). If it is determined that the switching flag is Fs=0 (S109: YES), the processing proceeds to S112. If it is determined that the switching flag Fs=0 is not established (S109: NO), that is, if the switching flag Fs=1 is established, the processing proceeds to S110. The count value Cs of the switching counter is incremented in S110.

In S111, it is checked whether or not the count value Cs of the switching counter is equal to or higher than the predetermined value. The predetermined value is set to 10, for example. The check processing here checks whether or not the predetermined time has elapsed after the q-axis current Iq became negative from positive. If it is determined that the count value Cs of the switching counter is lower than the predetermined value (S111: NO), that is, if the predetermined time has not elapsed after the q-axis current Iq became negative from positive, the processing returns to S102. If it is determined that the count value Cs of the switching counter is equal to or higher than a predetermined value (S111: YES), that is, if the predetermined time has elapsed after the q-axis current Iq became negative from positive, the processing proceeds to S112.

In S112, the switching flag is set to Fs=0. Further, the switching counter is reset and the processing returns to S102. In addition, if S112 is executed after the q-axis current Iq is determined to be negative and the switching flag Fs=0 is established (S104: N0 and S109: YES), the second state where the first duty center value Dc1 is shifted to be higher than the output center value Rc and the second duty center value Dc2 is shifted to be lower than the output center value Rc is continued. Additionally, if the S112 is executed after the q-axis current is determined to be negative, the switching flag Fs=1 is established, and the count value Cs of the switching counter is determined to be equal to or higher than the predetermined value (S104: NO, S109: NO, S111: YES), the predetermined time has elapsed after the q-axis current Iq became negative from positive. Thus, the switching flag is set to Fs=0 in order to perform switching from the first state where the first duty center value Dc1 is shifted to be lower than the output center value Rc and the second duty center value Dc2 is shifted to be higher than the output center value Rc to the second state where the first duty center value Dc1 is shifted to be higher than the output center value Rc and the second duty center value Dc2 is shifted to be lower than the output center value Rc.

Thus, in the first embodiment, when the q-axis current Iq is positive this is set as the first state, and when the q-axis current Iq is negative this is set as the second state. In addition, since the q-axis current Iq is calculated based on current detection values Iu1, Iv1, Iw1, Iu2, Iv2, and Iw2, and the motor rotation angle θe, the q-axis current is influenced by the detection noise or the like of each sensor. In order to avoid such a situation that switching of the shift directions of the first duty command signal D1 and the second duty command signal D2 occur frequently as the positive and negative signs of the q-axis current Iq are frequently replaced with each other under the influence of detection noise when the q-axis current Iq is around 0, the shift directions are switched after an elapse of a predetermined time after the q-axis current Iq is switched to negative from positive or to positive from negative. Thereby, the switching between the first state and the second state can be stably performed.

Here, a test (heat generation test) in which the operation of driving a vehicle into a garage is simulated, and a state where the rotation of the motor 10 is stopped in a state where the switching is made to a right end or left end located at a steering end position, that is, a state where a maximum current is applied to the sets of windings 18 and 19, and the stopping of steering operation of steering the steering wheel 91 from the right end to the left end are repeated will be described. In the heat generation test of about 150 seconds, in a case where the state where one of the first duty command signal D1 and the second duty command signal D2 is shifted downwards and the other is shifted upwards is continued, the difference between the highest temperature and the lowest temperature of the FETs 21 to 26 and 31 to 36 is about 20 to 30° C. On the other hand, as in the first embodiment, in the case where the switching between the first state and the second state is performed based on the q-axis current Iq, there is almost no temperature difference between the high-side FETs 21 to 23 and 31 to 33 and the low-side FETs 24 to 26 and 34 to 36. Additionally, in the case where the switching between the first state and the second state is performed based on the q-axis current Iq, the temperature of an FET whose highest temperature has been raised become low by about 10° C., as compared to the case where the state where one of the first duty command signal D1 and the second duty command signal D2 is shifted downwards and the other is shifted upwards is continued.

Thereby, heat dissipation members (for example, heat sinks or the like) for dissipating heat generated in the FETs 21 to 26 and 31 to 36 can be reduced in size, and the overall apparatus can be made lightweight. Additionally, the amounts of heat generated in the FETs 21 to 26 and 31 to 36 are proportional to resistor values. Additionally, the resistor values are in inverse proportion to the area of a chip. If a temperature rise equivalent to the case where the switching between the first state and the second state and the case where the switching between the first state and the second state is not performed is permitted as in the first embodiment, it is possible to make the chip area of the FETs 21 to 26 and 31 to 36 small, and the cost can be reduced.

As described in detail above, the power conversion device 1 is provided for a multiphase rotating electric machine having the first set of windings 18 formed by the coils 11 to 13 and the second set of windings formed by the coils 14 to 16, which correspond to respective phases of the motor 10 of the electric power steering apparatus 100 that imparts assist torque to the steering wheel 91. The power conversion device 1 includes the first inverter circuit 20 and the second inverter circuit 30, the capacitor 50, and the microcomputer 51. The first inverter circuit 20 provided to correspond to the first set of windings 18 has the FETs 21 to 26 corresponding to respective phases of the coils 11 to 13. Additionally, the second inverter circuit 30 provided to correspond to the second set of windings 19 has the FETs 31 to 36 corresponding to respective phases of the coils 14 to 16. The capacitor 50 is connected to the first inverter circuit 20 and the second inverter circuit 30. The microcomputer 51 controls on/off of the FETs 21 to 26 and 31 to 36 based on the first duty command signal D1 related to a voltage applied to the first set of windings 18 and the second duty command signal D2 related to a voltage applied to the second set of winding 19. Thereby, the driving of the motor 10 is controlled by controlling the electric power to be supplied to the sets of windings 18 and 19 of the motor 10.

Additionally, the microcomputer 51 switches over the control operation states between the first state and the second state according to the steering state of the steering wheel 91. In the first state, the first duty center value Dc1 is shifted to be lower than the output center value Rc that is the center value of the possible duty range and the second duty center value Dc2 is shifted to be higher than the output center value Rc. In the second state, the first duty center value Dc1 is shifted to be higher than the output center value Rc and the second duty center value Dc2 is shifted to be lower than the output center value Rc.

One of the duty command signals D1 and D2 is shifted to be lower than the output center value Rc, and the other is shifted to be higher than the output center value Rc. Thereby, since the timing of charging and discharging of the capacitor 50 by one of the first inverter circuit 20 and the second inverter circuit 30 and the timing of charging and discharging of the capacitor 50 by the other can be shifted, the ripple current of the capacitor 50 can be reduced.

Additionally, since the shift directions of the duty command signals D1 and D2 related to the driving of the respective inverter circuits 20 and 30 are switched according to the steering state of the steering wheel 91, a difference in on-time between FETs 21 to 26 and 31 to 36 can be made small, and a difference in heat loss between FETs 21 to 26 and 31 to 36 can be reduced.

Particularly, the power conversion device 1 is applied to the electric power steering apparatus 100. Although the steering wheel 91 is steered to the right and left, the straight-ahead traveling state is necessarily present if the traveling of a vehicle is taken into consideration. That is, the operation of returning to the left is performed after being steered to the right, and the operation of returning to the right is performed after being steered to the left. Particularly, the time for which the steering wheel 91 is steered rightward and the time for which the steering wheel is steered leftward become approximately equal at the stopping of steering operation, such as driving a vehicle into a garage in which the amount of an applied a current increases. In the present embodiment, the shift directions of the duty command signals D1 and D2 are switched according to the steering state of the steering wheel 91 in consideration of how to use such an electric power steering apparatus 100. Thereby, since the difference between the time for which the duty command signal D1 or D2 is shifted upwards and the time for which the duty command signal is shifted downwards can be made small, difference in on-time in the FETs 21 to 26 and 31 to 36 becomes small, and a difference in heat loss can be reduced.

Additionally, the microcomputer 51 calculates current command values Id* and Iq* related to currents applied to the sets of windings 18 and 19, based on the steering torque indicating the steering state of the steering wheel 91. Additionally, the microcomputer 51 switches the operation between the first state and the second state based on the q-axis current Iq that is an actual current value applied to the sets of windings 18 and 19 based on current command values Id* and Iq*. That is, the first state and the second state are switched over based on the q-axis current that is a value based the steering torque. Since the amount of heat generated in the FETs 21 to 26 and 31 to 36 changes according to the amount of the applied current, a difference in heat loss in the FETs 21 to 26 and 31 to 36 can be appropriately reduced by switching the operation between the first state and the second state based on the q-axis current Iq that is a value based on the steering torque. Additionally, since generation of heat in the FETs 21 to 26 and 31 to 36 is made substantially equal without calculating the integrated current values to be actually applied to the FETs 21 to 26 and 31 to 36, calculation load can be reduced. Since it is thus not necessary to use a highly-expensive microcomputer or the like, the cost can be reduced.

Additionally, in a case where the predetermined time has not elapsed after switching from one of the first state and the second state to the other is performed (S107: N0 or S111: NO in FIG. 9), the microcomputer 51 does not perform switching from the other of the first state and the second state to the one. That is, in a case where the predetermined time has not elapsed after switching to the second state from the first state is performed (S107: NO), switching to the first state from the second state is not performed. Additionally, in a case where the predetermined time has not elapsed after switching to the first state from the second state is performed (S111: NO), switching to the second state from the first state is not performed. That is, the power conversion device 1 has a temporal dead zone related to switching from one of the first state and the second state to the other. Thereby, it is possible to avoid a situation, in which the switching between the first state and the second state is frequently performed.

Moreover, the shift amount M1 of the first duty center value Dc1 from the output center value Rc is variable according to the amplitude of the first duty command signal D1, and the shift amount M2 of the second duty center value Dc2 from the output center value Rc is variable according to the amplitude of the second duty command signal D2. Thereby, a difference in on-time between FETs 21 to 26 and 31 to 36 can be made small, and a difference in heat loss can be appropriately reduced.

In addition, when the q-axis current Iq is positive is the first state and when the q-axis current Iq is negative is the second state. However, when the q-axis current Iq is positive may be the second state and when the q-axis current Iq is negative may be the first state.

(Second Embodiment)

Since a power conversion device according to a second embodiment is different from the first embodiment in respect of shift direction specifying processing, the shift direction specifying processing will be mainly described, and the description of the other components is omitted.

Figure 10:
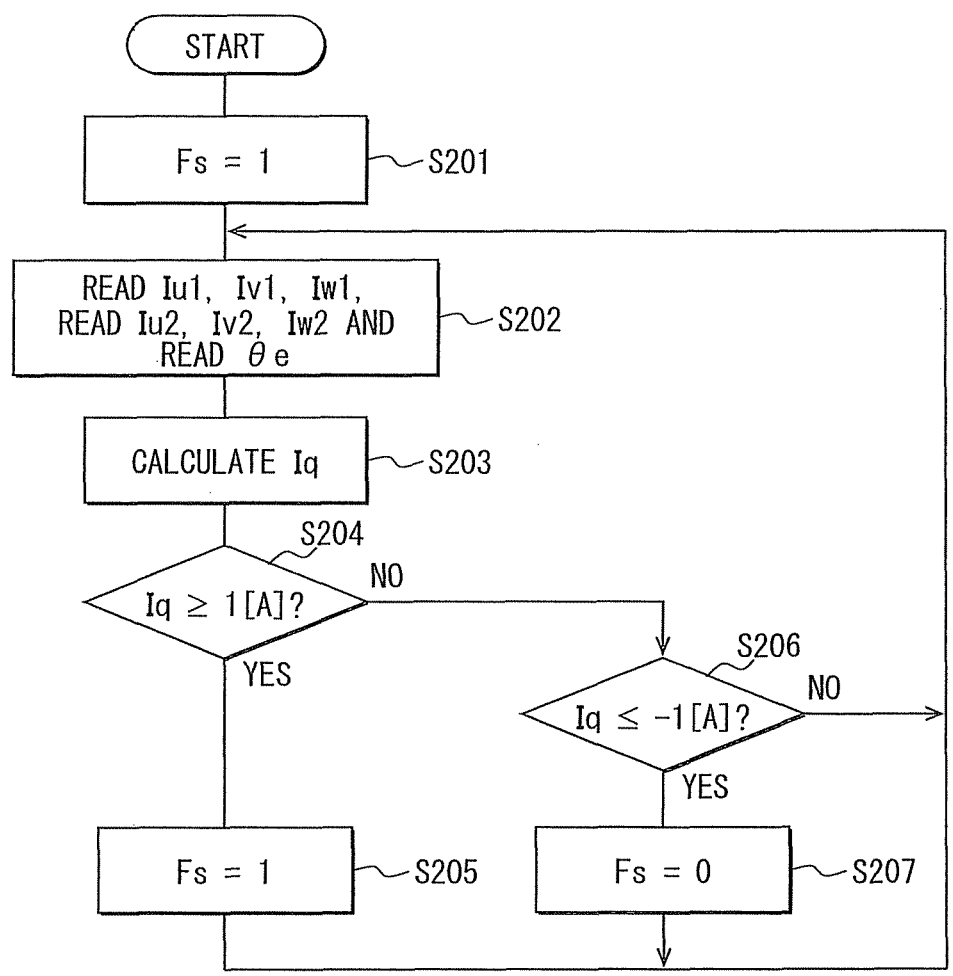
FIG. 10 is a flowchart illustrating shift direction specifying processing performed in a second embodiment of the invention.

The shift direction specifying processing according to the second embodiment will be described with reference to a flowchart shown in FIG. 10.

In S201, the switching flag Fs is set to Fs=1 as a default. Similarly to the first embodiment, when the switching flag Fs=1 is established this shall be the first state where the first duty center value Dc1 is shifted to be lower than the output center value Rc and the second duty center value Dc2 is shifted to be higher than the output center value Rc. Further, when the switching flag Fs=0 is established this shall be the second state where the first duty center value Dc1 is shifted to be higher than the output center value Rc and the second duty center value Dc2 is shifted to be lower than the output center value Rc.

Figure 9:
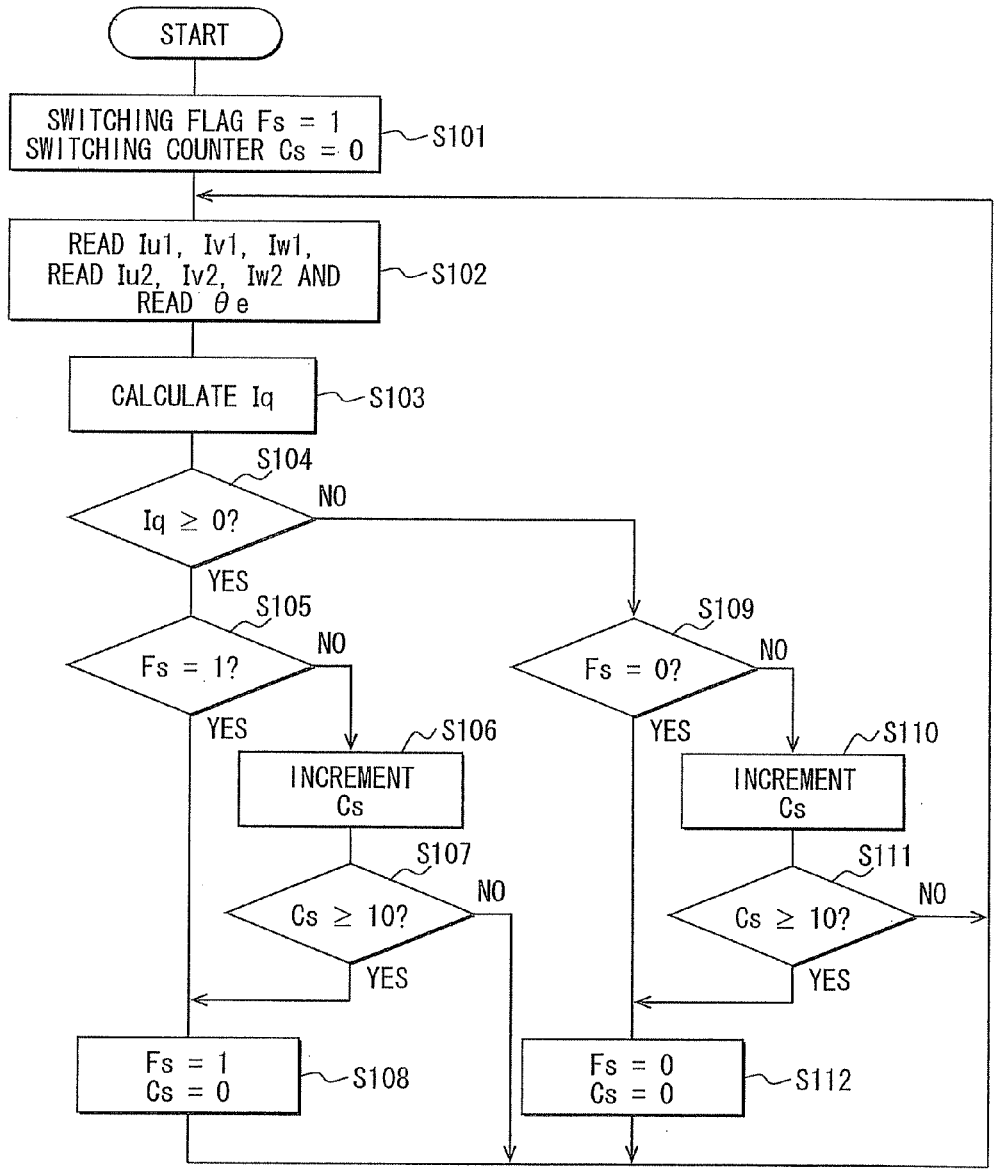
FIG. 9 is a flowchart illustrating shift direction specifying processing performed in the first embodiment of the invention.

In S202, similarly to S102 in FIG. 9, the current detection value Iu1 of the U1 coil 11, the current detection value Iv1 of the V1 coil 12, and the current detection value Iw1 of the W1 coil 13 are read. Additionally, the current detection value Iu2 of the U2 coil 14, the current detection value Iv2 of the V2 coil 15, and the current detection value Iw2 of the W2 coil 16 are read. Moreover, the rotation angle θe of the motor 10 is read.

In S203, similarly to S103 in FIG. 9, the q-axis current Iq as the actual current value is calculated based on the current detection values Iu1, Iv1, Iw1, Iu2, Iv2, and Iw2 and the motor rotation angle θe. The q-axis current Iq is calculated by the above formula (1).

In S204, it is checked whether or not the q-axis current Iq is equal to or higher than a first threshold value. The first threshold value is set to 1[A], for example. If the q-axis current Iq is determined to be lower than the first threshold value (S204: NO), the processing proceeds to S206. If the q-axis current Iq is determined to be equal to or higher than the first threshold value (S204: YES), the processing proceeds to S205.

In S205, the switching flag is set to Fs=1, and the processing returns to S202. That is, when the switching flag Fs=1 is already set, the first state where the first duty center value Dc1 is shifted to be lower than the output center value Rc and the second duty center value Dc2 is shifted to be higher than the output center value Rc is continued. Additionally, in a case where the switching flag Fs=0 is established, the switching flag is set to Fs=1 in order to perform switching from the second state where the first duty center value Dc1 is shifted to be higher than the output center value Rc and the second duty center value Dc2 is shifted to be lower than the output center value Rc to the first state where the first duty center value Dc1 is shifted to be lower than the output center value Rc and the second duty center value Dc2 is shifted to be higher than the output center value Rc.

In S206, which is performed when the q-axis current Iq is determined to be lower than the first threshold value (S204: NO), it is checked whether or not the q-axis current Iq is equal to or lower than a second threshold value that is lower than the first threshold value. The second threshold value is set to −1[A], for example. If the q-axis current Iq is determined to be higher than the second threshold value (S206: NO), the processing returns to S202. If the q-axis current Iq is determined to be equal to or lower than the second threshold value (S206: YES), the processing proceeds to S207.

In S207, the switching flag is set to Fs=0, and the processing returns to S202. That is, in a case where the switching flag Fs=0 is established, the second state where the first duty center value Dc1 is shifted to be higher than the output center value Rc and the second duty center value Dc2 is shifted to be lower than the output center value Rc is continued. Additionally, in a case where the switching flag Fs=1 is established, the switching flag is set to Fs=0 in order to perform switching from the first state where the first duty center value Dc1 is shifted to be lower than the output center value Rc and the second duty center value Dc2 is shifted to be higher than the output center value Rc to the second state where the first duty center value Dc1 is shifted to be higher than the output center value Rc and the second duty center value Dc2 is shifted to be lower than the output center value Rc.

In the second embodiment, when the q-axis current Iq is equal to or higher than 1A that is the first threshold value, this is set as the first state. When the q-axis current Iq is equal to or lower than −1A that is the second threshold value, this is set as the second state. Additionally, in a case where the q-axis current Iq is higher than −1A and lower than 1A, the last first state or second state is continued, and switching from one of the first state and the second state to the other is not performed. Thereby, even if the q-axis current Iq fluctuates under the influence of detection noise of each sensor or the like, hysteresis is provided with the first threshold value and the second threshold value as different values, so that substantially the same effects as those when a dead zone is provided can be obtained. It is thus avoided that the switching between the first state and the second state is frequently performed. Thereby, the switching between the first state and the second state can be stably performed.

Accordingly, the same effects as those described in the first embodiment can be exhibited.

In addition, when the q-axis current Iq is equal to or higher than the first threshold value, this is set as the first state. When the q-axis current Iq is equal to or lower than the second threshold value, this is set as the second state. However, when the q-axis current Iq is equal to or higher than the first threshold value, this is set as the second state. When the q-axis current Iq is equal to or lower than the second threshold value, this is set as the first state.

(Third Embodiment)

Since a power conversion device according to a third embodiment is different from the first and the second embodiments in respect of shift direction specifying processing, the shift direction specifying processing will be mainly described, and the description of the other components is omitted.

In the third embodiment, the first state and the second state are determined based on the steering angle θs of the steering wheel 91 instead of the q-axis current Iq. The first state is determined to be a case, in which the steering wheel 91 is steered rightward, and the first duty center value Dc1 is shifted to be lower than the output center value Rc and the second duty center value Dc2 is shifted to be higher than the output center value Rc. The second state is determined to be a case, in which the steering wheel 91 is steered leftward, and the first duty center value Dc1 is shifted to be higher than the output center value Rc and the second duty center value Dc2 is shifted to be lower than the output center value Rc.

Switching of the shift directions of the duty command signals D1 and D2 based on the steering direction of the steering wheel 91 will be described with reference to FIG. 11. In FIG. 11, the first state is indicated as #1, and the second state is indicated as #2.

Here, it is assumed that the steering wheel 91 is steered by a driver and the steering angle θs changes as shown in FIG. 11.

In periods TA1, TA2, and TA3, when the steering angle θs is increasing as shown in FIG. 11, the steering wheel 91 is steered rightward (R) by the driver, whereby a right turning is made. At this time, the first state #1 is set so that the first duty center value Dc1 is shifted to be lower than the output center value Rc and the second duty center value Dc2 is shifted to be higher than the output center value Rc.

On the other hand, in periods TB1 and TB2, when the steering angle θs is decreasing as shown in FIG. 11, the steering wheel 91 is steered leftward (L) by the driver, whereby a left turning is made. At this time, the second state #2 is set so that the first duty center value Dc1 is shifted to be higher than the output center value Rc and the second duty center value Dc2 is shifted to be lower than the output center value Rc.

In the second embodiment, the steering angle θs showing the steering state of the steering wheel 91 is calculated in the microcomputer 51. Additionally, the first state and the second state are switched over based on the steering angle θs in cases where the steering wheel 91 is steered leftward and rightward. This can appropriately reduce a difference in heat loss in the FETs 21 and 26 and 31 to 36, similarly to the first and the second embodiments.

Additionally, the same effects as those described in the first and the second embodiments can be exhibited.

In addition, in the third embodiment, when the steering wheel 91 is steered rightward, this is set as the first state. When the steering wheel is steered leftward, this is set as the second state. However, it is possible to set the first state when the steering wheel 91 is steered leftward, and set the second state when the steering wheel 91 is steered rightward.

Additionally, in the third embodiment, the microcomputer 51 calculates the steering angle θs based on the steering angle signal detected by the steering angle sensor 95 that acquires the steering angle signal according to the steering angle θs of the steering wheel 91. Thereby, the steering angle θs can be directly calculated.

(Fourth Embodiment)

Since a power conversion device according to a fourth embodiment is different from the first to the third embodiments in respect of shift direction specifying processing, the shift direction specifying processing will be mainly described, and the description of the other components is omitted. In the fourth embodiment, the first state is set to a case where the steering position of the steering wheel 91 is on the right from the center based on the steering angle θs of the steering wheel 91. In the first state, the first duty center value Dc1 is shifted to be lower than the output center value Rc and the second duty center value Dc2 is shifted to be higher than the output center value Rc. The second state is set to a case where the steering position of the steering wheel 91 is on the left from the center. In the second state, the first duty center value Dc1 is shifted to be higher than the output center value Rc and the second duty center value Dc2 is shifted to be lower than the output center value Rc.

Switching of the shift directions of the duty command signals D1 and D2 based on the steering position of the steering wheel 91 will be described with reference to FIGS. 12. In addition, in FIG. 12, the first state is indicated as #1 and the second state is indicated as #2.

Here, it is assumed that the steering wheel 91 is steered by a driver and the steering angle θs changes as shown in FIG. 12.

In a period TA11, when the steering angle θs is equal to or higher than 0 as shown in FIG. 12, the steering position of the steering wheel 91 is on the right from the center. This period TA11 corresponds to the first state where the first duty center value Dc1 is shifted to be lower than the output center value Rc and the second duty center value Dc2 is shifted to be higher than the output center value Rc.

On the other hand, in a period TB11, when the steering angle θs is lower than 0 as shown in FIG. 12, the steering position of the steering wheel 91 is on the left from the center. This period TB11 corresponds to the second state where the first duty center value Dc1 is shifted to be higher than the output center value Rc and the second duty center value Dc2 is shifted to be lower than the output center value Rc.

In the fourth embodiment, the microcomputer 51 calculates the steering angle θs indicating the steering state of the steering wheel 91. Additionally, the microcomputer 51 switches the operation between the first state and the second state based on the steering angle θs in cases where the steering position of the steering wheel 91 is on the right from the center and on the left from the center. This can reduce a difference in heat loss in the FETs 21 to 26 and 31 to 36, similarly to the first to the third embodiments.

Additionally, the same effects as those described in the first to the third embodiments can be exhibited.

In addition, in the fourth embodiment, when the steering position of the steering wheel 91 is on the right from the center, this is set as the first state. When the steering position of the steering wheel is on the left from the center, this is set as the second state. However, when the steering position of the steering wheel 91 is on the right from the center, this may be set as the second state. When the steering position of the steering wheel is on the left from the center, this may be set as the first state.

(Other Embodiments)

(A) Switching of Shift Direction Based on Current Command Value

In the first embodiment and the second embodiment, the first state and the second state are switched over based on the q-axis current Iq. In the other embodiments, however, the first state and the second state may be switched over based on current command values related to currents applied to the sets of windings 18 and 19, for example, the q-axis current command value Iq* instead of the q-axis current Iq. This can appropriately reduce a difference in heat loss in the FETs 21 to 26 and 31 to 36, similarly to the first and the second embodiments. Additionally, since a current command value generally has a dead zone of an assist current near the steering torque 0 Nm, the switching between the first state and the second state can be stably performed without being influenced by detection noise of each sensor or the like.

(B) Switching of Shift Direction Based on Direction of Steering Torque

Additionally, the first state and the second state may be switched over based on the steering torque, that is, whether leftward steering torque is detected or rightward steering torque is detected. For example, the case where the rightward steering torque is detected is set as the first state, and the case where the leftward steering torque is detected is set as the second state. Additionally, the case where the rightward steering torque is detected may be set as the second state, and the case where the leftward steering torque is detected may be set as the first state. This can appropriately reduce a difference in heat loss in the FETs 21 to 26 and 31 to 36, similarly to the first to the fourth embodiments.

(C) Switching of Shift Direction Based of Rotational Direction of Rotating Electric Machine Additionally, the first state and the second state may be switched over based on the rotational direction of the motor 10. Since the rotational direction of the motor 10 substantially coincides with the direction of the steering torque, even if the switching between the first state and the second state is performed based on the rotational direction of the motor 10, it can reduce appropriately a difference in heat loss in the FETs 21 to 26 and 31 to 36, similarly to the first to the fourth embodiments.

In addition, the rotational direction of the motor 10 can be detected by a sensor output value of the resolver 55 as in the first to the fourth embodiments. Rotation angle sensors other than the resolver may be used. Additionally, a sensorless configuration with no rotation angle sensor may be provided, and the rotational direction may be detected by an estimated rotational frequency operation in the microcomputer 51.

In addition, the rotational direction of the motor 10 may not coincide with the direction of the steering torque. For example, in a case where the steering wheel 91 is turned leftward at a left turn during traveling, and the left turn is finished to return the steering wheel 91 to the center, the driver may return the steering wheel 91 slowly in order to adjust the turn orbit of the vehicle. In such a case, the rotational direction of the motor 10 and the direction of the steering torque do not coincide with each other. Here, since such an operation is as short as about several seconds, and an assist current at the above operation during traveling is as small as about ⅓ of the assist current at a stop, the influence exerted on the amount of heat generated in the FETs 21 to 26 and 31 to 36 is reduced.

(D) Shift Direction Specifying Processing

Additionally, in the third embodiment, the first state and the second state are switched over based on the steering angle θs in cases where the steering wheel 91 is steered rightward and leftward. The switching between the first state and the second state may be performed after it is determined that a predetermined time has elapsed as in the first embodiment. Moreover, for example, by determining the steering direction based on steering angle speed, hysteresis may be provided so that the first threshold value and the second threshold value related to the switching between the first state and the second state are different from each other as in the second embodiment.

Additionally, in the fourth embodiment, the first state and the second state are switched over based on the steering angle θs in cases where the steering position of the steering wheel 91 is on the left from the center and on the right from the center. The switching between the first state and the second state may be performed after it is determined that a predetermined time has elapsed as in the first embodiment. Additionally, as in the second embodiment, hysteresis may be provided, with the first threshold value and the second threshold value related to the switching between the first state and the second state as different values.

Moreover, similarly to the case where the first state and the second state are switched over based on a current command value, the case where the first state and the second state are switched over based on the steering torque, or the case where the first state and the second state are switched based on the rotational direction of the motor 10, the switching between the first state and the second state may be performed after it is determined that a predetermined time has elapsed. Alternatively, hysteresis may be provided, with the first threshold value and the second threshold value related to the switching between the first state and the second state as different values.

By adopting such a configuration, it is possible to avoid frequent switching between the first state and the second state.

In addition, the processing of S105 and S107 in FIG. 9 may be omitted, and the processing may proceed to S108 if it is determined that the check result is YES in S104. In addition, the processing of S109 and S111 may be omitted, and the processing may proceed to S112 if it is determined in S104 that the check result is NO. In addition, the processing of S206 in FIG. 10 may be omitted, and the processing may proceed to S207 if it is determined in S204 that the answer is NO.

Moreover, in the above embodiments, the shift amount is made variable according to the amplitude of a duty command signal. In the other embodiments, however, the shift amount of the center value of a duty command signal from the output center value may not be made variable, and may be a predetermined amount (for example, 25% of the possible duty range).

(E) Rotation Angle Sensor

Although the resolver is used as the rotation angle sensor in the first to the fourth embodiments, a rotation angle sensor other than the resolver may be used. Additionally, a sensorless configuration with no rotation angle sensor may be provided, and an estimated rotational frequency operation may be performed in the microcomputer 51.

(F) Steering Angle Sensor

In the first to the fourth embodiments, the steering angle θs is calculated based on the sensor output value of the steering angle sensor 95. The rotation angle of the motor 10 may be acquired by the microcomputer 51 without the steering angle sensor 95, and the steering angle may be calculated based on the acquired rotation angle of the motor 10. Thereby, since the sensor or the like for detecting the steering angle can be omitted, the number of parts can be reduced.

(G) Modulation Processing

In the first to the fourth embodiments, the duty command signal is a sinusoidal signal. However, a neutral point voltage operation may be performed by performing two-phase modulation processing or three-phase modulation processing in order to improve a voltage utilization factor. For example, the following modulation processing may be performed.

(i) A value obtained by deducting a predetermined lower limit from a smallest duty among phases may be subtracted from duties of all phases so that the smallest duty among phases becomes the predetermined lower limit.

(ii) A value obtained by deducting a predetermined upper limit from a largest duty among phases may be subtracted from duties of all phases so that the largest duty among phases becomes the predetermined upper limit.

(iii) A third higher harmonic wave may be added to duties of all phases.

(iv) An average value of the largest duty among phases and the smallest duty among phases may be subtracted from duties of all phases.

(v) A value obtained by deducting a duty that falls below a predetermined lower limit, from the predetermined lower limit, or a value obtained by deducting the predetermined upper limit from a duty that exceeds a predetermined upper limit may be subtracted from duties of all phases.

A voltage utilization factor can be improved by performing such modulation processing. Additionally, different kinds of modulation processing may be performed in respective inverter circuits in such a manner that the modulation processing of the above (i) is performed in one inverter circuit, and the modulation processing of the above (ii) is performed in the other inverter circuit. Particularly, the ripple current of the capacitor 50 can be reduced by performing the modulation processing of the above (i) in one inverter circuit, and performing the modulation processing of the above (ii) in the other inverter circuit.

Additionally, the three-phase voltage command values Vu*, Vv*, and Vw* may be converted into duties after modulation processing is performed, or modulation processing may be performed after the three-phase voltage command values Vu*, Vv*, and Vw* may be converted into duties.

(H) Position of Current Detector

A current detector may be located at different positions as exemplified in FIGS. 13A to 13H. In addition, in FIGS. 13A to 13H, only the FETs 21 to 26 of the first inverter circuit 20 and the first set of windings 18 are shown and the configuration of the second inverter circuit 30, the second set of windings 19, and the like is omitted. Additionally, FIG. 13A corresponds to FIG. 3.

Figure 13A:
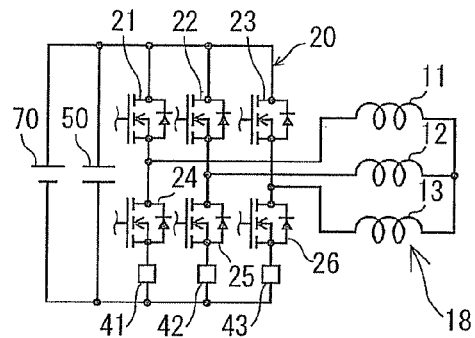
FIGS. 13A to 13H are circuit diagrams illustrating a modification of a location of a current detector in the embodiments.
Figure 13B:
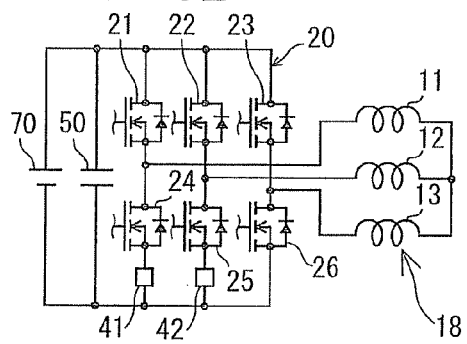

As shown in FIG. 13A, all the current detectors 41 to 43 are provided at the ground side of the low-side FETs 24 to 26. Additionally, as shown in FIG. 13B, one current detector 43 provided between the W low-side FET 26 and the ground in FIG. 13A may be excluded. As in this example, even if a current detector of one phase among n phases is excluded, currents of all phases can be detected by a difference from a power source current. That is, current detectors of two phases may be provided if currents of three phases are detected, and current detectors of four phases may be provided if currents of five phases are detected. Additionally, the phase that omits a current detector may be an arbitrary phase.

Figure 13C:
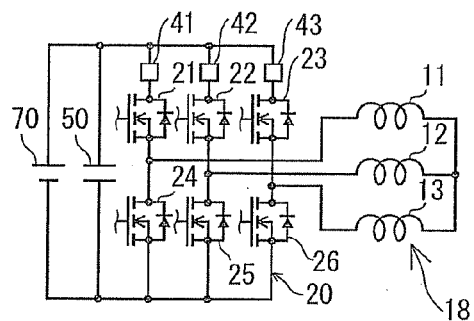
Figure 13D:
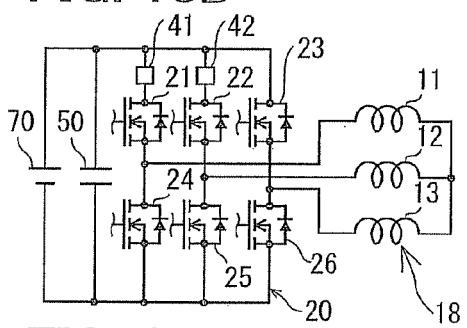

Additionally, as shown in FIG. 13C, current detectors 41 to 43 may be provided at a power source side of the high-side FETs 21 to 23. Additionally, as shown in FIG. 13D, one current detector 43 provided between the W high-side FET 23 and the power source in FIG. 13C may be excluded. The exclusion of a current detector of one phase among n phases is the same as that described in FIG. 13B.

Figure 13E:
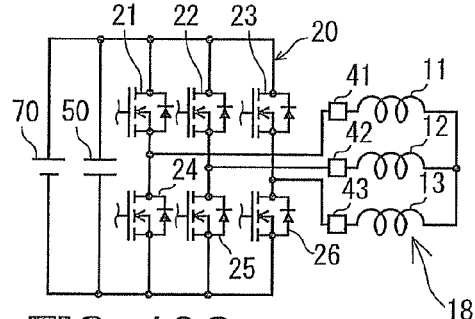
Figure 13F:
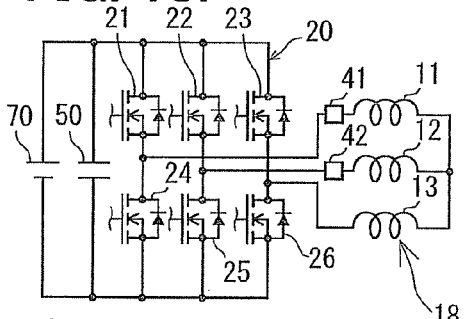

As shown FIG. 13E, all the current detectors 41 to 43 may be provided between the respective node between the high-side FETs 21 to 23 and the low-side FETs 24 to 26, and the corresponding coils 11 to 13. Additionally, as shown in FIG. 13F, one current detector 43 provided between the W high-side FET 23 and the coil 13 in FIG. 13E may be excluded. The exclusion of a current detector of one phase among n phases is the same as that described in FIG. 13B.

Figure 13G:
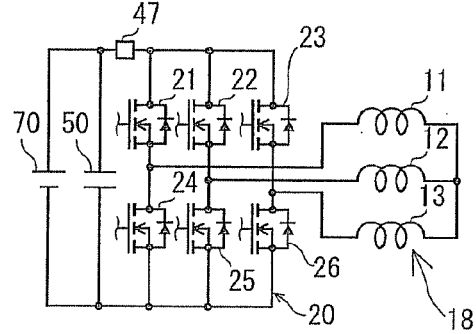

Additionally, as shown in FIG. 13G, only one current detector 47 may be provided between a bridge circuit branch point of the first inverter circuit 20 at the positive electrode of the battery 70 side and the positive electrode of the battery 70. In this case, the current detector 47, as shown in FIG. 13C detects the sum of the current detection values obtained by current detectors 41 to 43 provided at the high-side FETs.

Figure 13H:
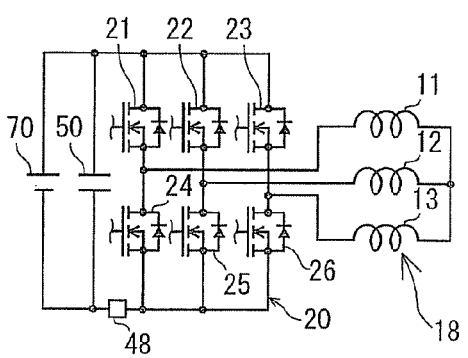

Moreover, as shown in FIG. 13H, only one current detector 48 may be provided between a bridge circuit branch point of the first inverter circuit 20 at the ground side and the ground. In this case, the current detector 48 detects the sum of current detection values obtained by the current detectors 41 to 43 of FIG. 13A.

(I) Type of Current Detector

Although the shunt resistor is used as a current detector in the first to the fourth embodiments, a Hall element or the like may be used alternatively. Particularly, in a case where current detectors are provided at positions shown in FIGS. 13E and 13F, it is preferable to use the Hall element instead of the shunt resistor.

Meanwhile, in a case where the shunt resistors are provided at the positions shown in FIGS. 13A and 13B as current detectors, since a current (peak-side currents) applied to current detectors 41 to 43 when all the low-side FETs 24 to 26 are turned on at the peak of the PWM reference signal coincide with a current applied to the first set of windings 18, the peak-side currents are detected as a winding current. On the other hand, currents (valley-side currents) applied to current detectors 41 to 43 when all the low-side FETs 24 to 26 are turned off at the valley of the PWM reference signal is used for correction of the winding current according to the temperature change of a shunt resistor or an amplifier circuit.

That is, in a case where the shunt resistor is used as the current detector, it is necessary to secure a period for which all the low-side FETs 24 to 26 are turned on and a period for which all the low-side FETs 24 to 26 are turned off at the peak or valley of the PWM reference signal. Additionally, in a case where a current is detected by the shunt resistor, it is necessary to secure a time (for example, 4.5 microseconds) for which rigging is converged or a hold time for which switching of on/off of the FETs 21 to 26 is not performed.

Thus, the possible duty range may be determined based on the time taken to detect a current in a current detector. That is, although 0% to 100% is set as the possible duty range in the above embodiments, for example, 7% to 93% may be set as the possible duty range. Additionally, for example, in a case where correction of the winding current is unnecessary in a state where 0% to 93% is set as the possible duty range, only the upper limit of the possible duty range may be determined based on the time taken to detect a current in a current detector.

Additionally, in a case where the shunt resistors are provided at the positions shown in FIGS. 13C and 13D as current detectors, since the valley-side currents applied to the current detectors 41 to 43 when all the high-side FETs 21 to 23 are turned on at the valley of the PWM reference signal coincide with a current applied to the first set of windings 18, the valley-side currents are detected as the winding current. On the other hand, the peak-side currents that flow through current detectors 41 to 43 when all the high-side FETs 21 to 23 are turned off at the peak of the PWM reference signal are used for correction of the winding current according to the temperature change of a shunt resistor or an amplifier circuit.

Thus, in order to secure a period for which all the high-side FETs 21 to 23 are turned on and a period for which all the high-side FETs 21 to 23 are turned off at the peak or valley of the PWM reference signal, the possible duty range may be determined based on the time taken to detect a current in a current detector. For example, 7% to 93% may be set as the possible duty range. Additionally, for example, in a case where correction of the winding current is unnecessary in a state where 7% to 100% is set as the possible duty range, only the lower limit of the possible duty range may be determined based on the time taken to detect a current in a current detector.

Thereby, a current applied to a set of windings by a current detector can be appropriately detected.

Moreover, in a bootstrap type gate drive circuit, it is necessary to turn on all low-side FETs 24 to 26 in each predetermined cycle. Therefore, the upper limit of the possible duty range cannot be 100%. Thus, the upper limit of the possible duty range may be determined based on a gate drive circuit configuration.

In addition, although current detection of the first inverter circuit 20 and the first set of windings 18 are described, the same is also true on a current detection of the second inverter circuit 30 and the second set of windings 19.

(J) Configuration of Motor

Figure 14A:
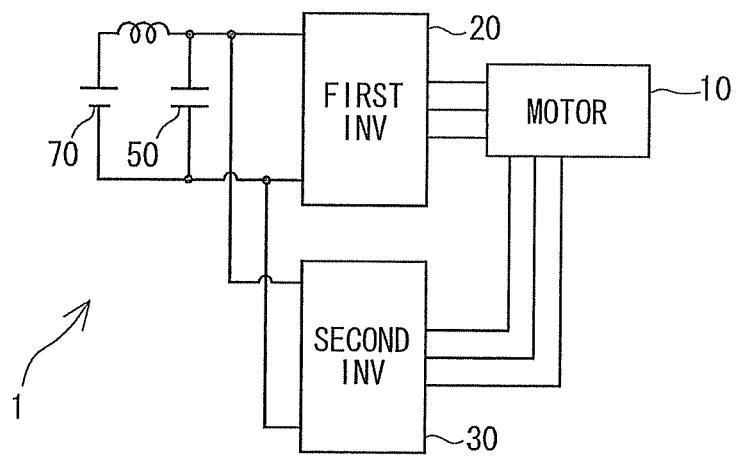
FIGS. 14A and 14B are schematic diagrams illustrating modifications of the embodiments.
Figure 14B:
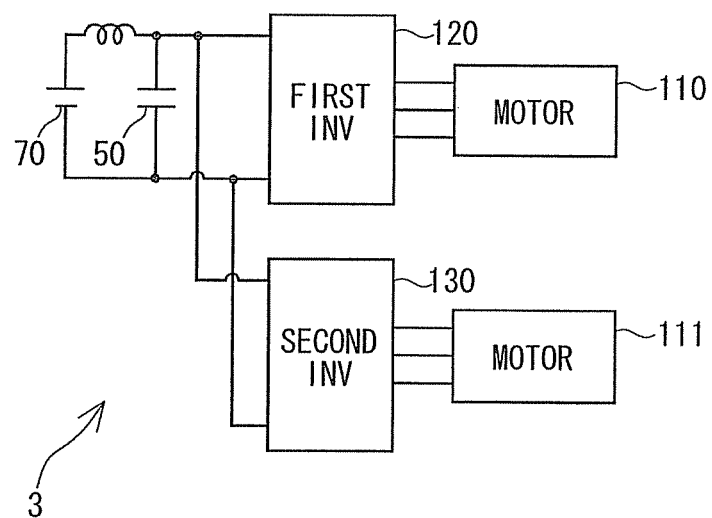

In the first to the fourth embodiments, as shown schematically in FIG. 14A, two inverter circuits 20 and 30 drive one motor 10. Alternatively, as shown schematically in FIG. 14B, two inverter circuits 120 and 130 may drive respectively separate motors 110 and 111. That is, in a power conversion device 3, the first inverter circuit 120 drives the first motor 110, and the second inverter circuit 130 drives the second motor 111.

It should be understood that the present invention is not at all limited to the above-described embodiments and modifications, but may be implemented in various forms without departing from the concept of the invention.

What is claimed is:

1. A power conversion device for a multiphase rotating electric machine including a first and a second sets of windings, each set being formed by windings corresponding to each phase of the rotating electric machine of an electric power steering apparatus that imparts assist torque to a steering member, the power conversion device comprising:
a first and a second inverter circuits provided for the first and the second sets of windings, respectively, each inverter circuit having switching elements corresponding to each phase of each set of windings;
a capacitor connected to the first and the second inverter circuits; and
a control circuit that controls on/off of the switching elements based on a first voltage command signal related to a first voltage applied to the first set of windings and a second voltage command signal related to a second voltage applied to the second set of windings,
wherein the control circuit switches a control operation between a first state and a second state according to a steering state of the steering member,
the first state corresponding to a case where a center value of the first voltage command signal is shifted to be lower than an output center value that is a center value of a possible duty range and a center value of the second voltage command signal is shifted to be higher than the output center value, and
the second state corresponding to a case where the center value of the first voltage command signal is shifted to be higher than the output center value and the center value of the second voltage command signal is shifted to be lower than the output center value.

2. The power conversion device according to claim 1, wherein:
the control circuit calculates a first and a second current command values related to currents applied to the first and the second sets of windings based on steering torque, which indicates the steering state of the steering member, respectively; and
the control circuit switches the control operation between the first state and the second state based on values of a first and a second actual currents applied to the first and the second sets of windings based on the first and the second current command values.

3. The power conversion device according to claim 1, wherein:
the control circuit calculates a first and a second current command values related to currents applied to the first and the second sets of windings based on steering torque, which indicates the steering state of the steering member, respectively; and
the control circuit switches the control operation between the first state and the second state based on the first and the second current command values.

4. The power conversion device according to claim 1, wherein:
the control circuit switches the control operation between the first state and the second state in a case where leftward steering torque is detected and in a case where rightward steering torque is detected, respectively, based on steering torque, which indicates the steering state of the steering member.

5. The power conversion device according to claim 1, wherein:
the control circuit switches the control operation between the first state and the second state based on a rotational direction of the rotating electric machine driven by steering torque of the steering member, which indicates the steering state.

6. The power conversion device according to claim 1, wherein:
the control circuit calculates a steering angle, which indicates the steering state of the steering member; and
the control circuit switches the control operation between the first state and the second state based on the steering angle, in a case where the steering member is steered leftward and in a case where the steering member is steered rightward.

7. The power conversion device according to claim 1, wherein:
the control circuit calculates a steering angle, which indicates the steering state of the steering member; and
the control circuit switches the control operation between the first state and the second state based on the steering angle, in a case where a steering position of the steering member is on a right side from a center position and in a case where the steering position of the steering member is on a left side from the center position.

8. The power conversion device according to claim 1, wherein:
the control circuit acquires a rotation angle of the rotating electric machine and calculates a steering angle, which indicates the steering state of the steering member, based on the acquired rotation angle; and
the control circuit switches the control operation between the first state and the second state based on the steering angle.

9. The power conversion device according to claim 1, wherein:
the control circuit calculates a steering angle based on a steering angle signal produced by a steering angle sensor attached to the steering member.

10. The power conversion device according to claim 1, wherein:
the control circuit performs, only after a predetermined time elapses from switching from one of the first and the second states to the other, switching from the other of the first and the second states to the one of the first and the second states.

11. The power conversion device according to claim 1, wherein:
the control circuit switches to the first state from the second state at a first threshold value and to the second state from the first state at a second threshold value, which is different from the first threshold value.

12. The power conversion device according to claim 1, wherein:
the control circuit varies a shift amount of the center value of the first voltage command signal from the output center value in accordance with an amplitude of the first voltage command signal; and
the control circuit varies a shift amount of the center value of the second voltage command signal from the output center value in accordance with an amplitude of the second voltage command signal.

* * * * *